(12) United States Patent
Horne et al.

(10) Patent No.: US 10,436,921 B2
(45) Date of Patent: Oct. 8, 2019

(54) MULTI-WELL ANISOTROPY INVERSION

(75) Inventors: Steve Allan Horne, Perth (AU); John Walsh, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1302 days.

(21) Appl. No.: 14/131,433

(22) PCT Filed: Jul. 26, 2012

(86) PCT No.: PCT/US2012/048213
§ 371 (c)(1),
(2), (4) Date: Sep. 12, 2014

(87) PCT Pub. No.: WO2013/016470
PCT Pub. Date: Jan. 31, 2013

(65) Prior Publication Data
US 2015/0012251 A1    Jan. 8, 2015

Related U.S. Application Data

(60) Provisional application No. 61/512,380, filed on Jul. 27, 2011.

(51) Int. Cl.
*G01V 1/30* (2006.01)
*G01V 1/42* (2006.01)
(Continued)

(52) U.S. Cl.
CPC .......... *G01V 1/306* (2013.01); *E21B 41/0092* (2013.01); *G01V 1/42* (2013.01); *G01V 1/284* (2013.01)

(58) Field of Classification Search
CPC .......... G01V 1/306; G01V 1/42; G01V 1/284; E21B 41/0092
(Continued)

(56) References Cited

U.S. PATENT DOCUMENTS

| 5,737,220 A | 4/1998 | Miller |
| 6,714,480 B2 | 3/2004 | Sinha et al. |

(Continued)

FOREIGN PATENT DOCUMENTS

| CN | 101553742 A | 10/2009 |
| CN | 101952743 A | 1/2011 |

(Continued)

OTHER PUBLICATIONS

Shuxin Jin, et al., "The Forward Modeling of Mudstone Fracture," Geophysical Prospecting for Petroleum, vol. 44, No. 2, pp. 191-123, 127 Mar. 2005.

(Continued)

*Primary Examiner* — Saif A Alhija
(74) *Attorney, Agent, or Firm* — Eileen Pape

(57) ABSTRACT

A method can include providing compressional and shear-wave slowness data for a homogeneous, anisotropic formation at deviated borehole angles greater than 40 degrees and less than 90 degrees as defined by a vertical transverse isotropy (VTI) symmetry axis; providing a relationship for normal and tangential compliances (e.g., $B_N$ and $B_T$); and, based on the data and the relationship, outputting a model for calculating anisotropy parameter values (e.g., $\alpha_0$, $\epsilon$, $\delta$) that characterize the homogeneous, anisotropic formation (e.g., along a borehole angle of 90 degrees). Various other apparatuses, systems, methods, etc., are also disclosed.

13 Claims, 16 Drawing Sheets

(51) Int. Cl.
*E21B 41/00* (2006.01)
*G01V 1/28* (2006.01)

(58) Field of Classification Search
USPC .......................................................... 703/2
See application file for complete search history.

(56) References Cited

U.S. PATENT DOCUMENTS

| | | | |
|---|---|---|---|
| 6,714,873 | B2 | 3/2004 | Bakulin et al. |
| 6,862,531 | B2 | 3/2005 | Horne et al. |
| 6,917,564 | B2 | 7/2005 | Leaney |
| 7,508,735 | B2 | 3/2009 | Grechka et al. |
| 7,679,993 | B2 | 3/2010 | Sayers |
| 7,924,652 | B2 * | 4/2011 | Tang ................... G01V 1/284 367/35 |
| 2003/0167835 | A1 | 9/2003 | Sinha et al. |
| 2007/0183259 | A1 | 8/2007 | Yogeswaren et al. |
| 2008/0298174 | A1 | 12/2008 | Tang et al. |
| 2009/0213693 | A1 | 6/2009 | Du et al. |
| 2009/0225628 | A1 | 9/2009 | Sayers |
| 2010/0250214 | A1 * | 9/2010 | Prioul ................... G01V 1/48 703/10 |
| 2010/0302903 | A1 | 12/2010 | Horne et al. |

FOREIGN PATENT DOCUMENTS

| | | |
|---|---|---|
| WO | 03/076967 | 9/2003 |
| WO | WO2009108432 A1 | 9/2009 |

OTHER PUBLICATIONS

Office action for the equivalent Chinese patent application No. 201280047346.6 dated Dec. 29, 2015.
Auld, 1990, Acoustic Fields and Waves in Solids, Krieger Publishing Company, NY.
Brevik et al., 2007, "Documentation and quantification of velocity anisotropy in shales using wireline log measurements," The Leading Edge, vol. 26, No. 3, pp. 272-277.
Erwemi et al., 2010, "Anisotropic velocity modeling for microseismic processing: Part 3—borehole sonic calibration case study," 2010 SEG Annual Meeting, Denver, Colorado, Expanded Abstracts 29, pp. 508-512.
Furre et al., 1998, "Characterization of angle dependency in sonic logs," 1998 SEG Annual Meeting, New Orleans, Louisiana, Expanded Abstracts 17, pp. 292-295.
Hornby et al., 2003, "Anisotropy correction for deviated-well sonic logs: Application to seismic well tie," Annual International Meeting, SEG No. 69, vol. 68, No. 2, pp. 464-471.
Hornby et al., 2003, "Do we measure phase or group velocity with dipole sonic tools?," 65th EAGE Conference, Extended Abstracts, F-29.
Mallan et al., 2011, "Simulation of borehole sonic waveforms in dipping, anisotropic, and invaded formations," Geophysics, vol. 76, No. 4, pp. E127-E139.
Musgrave, 1970, Crystal Acoustics, Holden-Day, San Francisco.
Sayers, 2008, "The effect of low aspect ratio pores on the seismic anisotropy of shales," Conference Paper, 2008 SEG Annual Meeting, Las Vegas, Nevada, Expanded Abstracts 27, pp. 2750-2754.
Sondergeld et al., 2000, "Ultrasonic measurement of anisotropy on the Kimmeridge Shale," 2000 SEG Annual Meeting, Calgary, Alberta, Expanded Abstracts 19, pp. 1858-1861.
Tang et al., 2005, "Characterizing seismic anisotropy using cross-dipole measurement in deviated wells," 2005 SEG Annual Meeting, Houston, Texas, Expanded Abstracts 24, pp. 372-376.
Thomsen, 1986, "Weak elastic anisotropy", Geophysics, vol. 51, No. 10, pp. 1954-1966.
Walsh et al., 2007, "Derivation of anisotropy parameters in a shale using borehole sonic data," 2007 SEG Annual Meeting, San Antonio, Texas, Expanded Abstracts 26, pp. 323-327.
Decision on Grant for Russian Application No. 2014107470/28(011758); Filed Jul. 26, 2012; dated Sep. 8, 2016. (16 pages).
P. Breton et al., "Well Positioned Seismic Measurements," Oilfield Review, pp. 32-45, Spring, 2002.
Office Action issued in the related CN application 201280047346.6, dated Aug. 11, 2016 (20 pages).
Office action issued in the related RU application 2014107470, dated Apr. 19, 2016 (12 pages).
International Search Report and Written Opinion issued in the related PCT Application PCT/US2012/048213, dated Jan. 30, 2013 (9 pages).
International Preliminary Report on Patentability issued in the related PCT Application PCT/US2012/048213, dated Jan. 28, 2014 (5 pages).
Hornby, B., Howie, J., and Ince, D., 1999, Anisotropy correction for deviated-well sonic logs: Application to seismic well tie, SEG Expanded Abstracts (5 pages).
Walsh, J., Sinha, B., Plona, T., Miller, D., and Bentley, D., 2007, Derivation of anisotropy parameters in a shale using borehole sonic data, SEG. (5 pages).

* cited by examiner

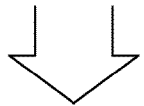

Wavefront Velocities and $\delta$ 1020

$$v_P(\Theta) = \alpha_0 * (1 + \delta * \sin^2\Theta * \cos^2\Theta + \varepsilon * \sin^4\Theta)$$

$$v_{SV}(\Theta) = \beta_0 * (1 + (\alpha_0^2/\beta_0^2)(\varepsilon - \delta) * \sin^2\Theta * \cos^2\Theta)$$

$$v_{SH}(\Theta) = \beta_0 * (1 + \gamma * \sin^2\Theta)$$

$$\delta^* \equiv [2*(C_{13} + C_{44})^2 - (C_{33} - C_{44})*(C_{33} + C_{33} - C_{44})] / [2*C_{33}^2]$$

$$\delta \equiv 0.5*[\varepsilon + \delta^*/(1 - \beta_0^2/\alpha_0^2)]$$

$$\delta = [(C_{13} + C_{44})^2 - (C_{33} - C_{44})^2] / [2*C_{33}(C_{33} - C_{44})]$$

Vertical and Horizontal Wavefronts 1040

| | Vertical: $\Theta = 0$ | Horizontal: $\Theta = \pi/2$ |
|---|---|---|
| Quasi-Compressional Wave (P-wave) | $v_P(0) = \alpha_0$ <br> $\alpha_0 = (C_{33}/\rho)^{0.5}$ <br> $C_{33} = \rho * v_P(0)^2$ <br> $C_{33} = \rho * S_P(0)^{-2}$ | $v_P(\pi/2) = \alpha_0 * (1 + \varepsilon)$ <br> $\varepsilon = (v_P(\pi/2) - \alpha_0)/\alpha_0$ <br> $C_{11} = \rho * v_P(\pi/2)^2$ <br> $C_{11} = \rho * S_P(\pi/2)^{-2}$ |
| Quasi-Shear-Wave Polarized in Vertical Plane (SV-wave) | $v_{SV}(0) = \beta_0$ <br> $\beta_0 = (C_{44}/\rho)^{0.5}$ <br> $C_{44} = \rho * v_{SV}(0)^2$ <br> $C_{44} = \rho * S_{SV}(0)^{-2}$ | $v_{SV}(\pi/2) = \beta_0$ <br> $\beta_0 = (C_{44}/\rho)^{0.5}$ <br> $C_{44} = \rho * v_{SV}(\pi/2)^2$ <br> $C_{44} = \rho * S_{SV}(\pi/2)^{-2}$ |
| True Shear-Wave Polarized in Horizontal Plane (SH-wave) | $v_{SH}(0) = \beta_0$ <br> $\beta_0 = (C_{44}/\rho)^{0.5}$ <br> $C_{44} = \rho * v_{SH}(0)^2$ <br> $C_{44} = \rho * S_{SH}(0)^{-2}$ | $v_{SH}(\pi/2) = \beta_0 * (1 + \gamma)$ <br> $\gamma = (v_{SH}(\pi/2) - \beta_0)/\beta_0$ <br> $C_{66} = \rho * v_{SH}(\pi/2)^2$ <br> $C_{66} = \rho * S_{SH}(\pi/2)^{-2}$ |

Fig. 10

Depth (m)

MULTI-WELL ANISOTROPY INVERSION

RELATED APPLICATION

This application claims priority to and the benefit of U.S. Provisional Patent Application No. 61/512,280, filed on Jul. 27, 2011, entitled "METHOD FOR MULTI-WELL ANISOTROPY INVERSION," the disclosure of which is incorporated by reference herein in its entirety.

BACKGROUND

An earthen formation can include layers of media where elasticity of the media may be isotropic, anisotropic or isotropic in certain aspects and anisotropic in others. Such media may be characterized through seismic studies where, for example, elastic waves generated by a source travel through the media to be sensed by one or more sensors. Decisions based on such characterizations may involve expending considerable resources, for example, to extract oil, gas, etc. Various technologies, techniques, etc., described herein pertain to characterization of media.

SUMMARY

A method can include providing compressional and shear-wave slowness data for a homogeneous, anisotropic formation at deviated borehole angles; providing a relationship for normal and tangential compliances; and, based on the data and the relationship, outputting a model for calculating anisotropy parameter values that characterize the homogeneous, anisotropic formation (e.g., along a borehole angle orthogonal to a vertical transverse isotropy symmetry axis). A system can include a processor; memory; and processor-executable instructions stored in the memory and executable by the processor to calculate anisotropy parameter values that characterize a homogeneous, anisotropic formation (e.g., along a borehole angle orthogonal to a vertical transverse isotropy symmetry axis) based at least in part on compressional and shear-wave slowness data for various different deviated borehole angles in the homogeneous, anisotropic formation. A computer-readable storage medium can include computer-executable instructions to instruct a computing device to: access a model and measured data for at least a deviated well in a formation; adjust elastic coefficients of the model to minimize an objective function, that depends on synthetic data computed using the model and the measured data, to provide optimized elastic coefficients for the model; perform a regression analysis on an empirical relationship that includes a parameter substitutable by at least one of the optimized elastic coefficients; and calculate a Thomsen parameter for a horizontal section of a well in the formation based at least in part on the model, the optimized elastic coefficients for the model and the regression analysis on the empirical relationship. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 10 illustrates examples of equations related to wavefront velocities and wavefronts in a formation.

DETAILED DESCRIPTION

Figure 1:
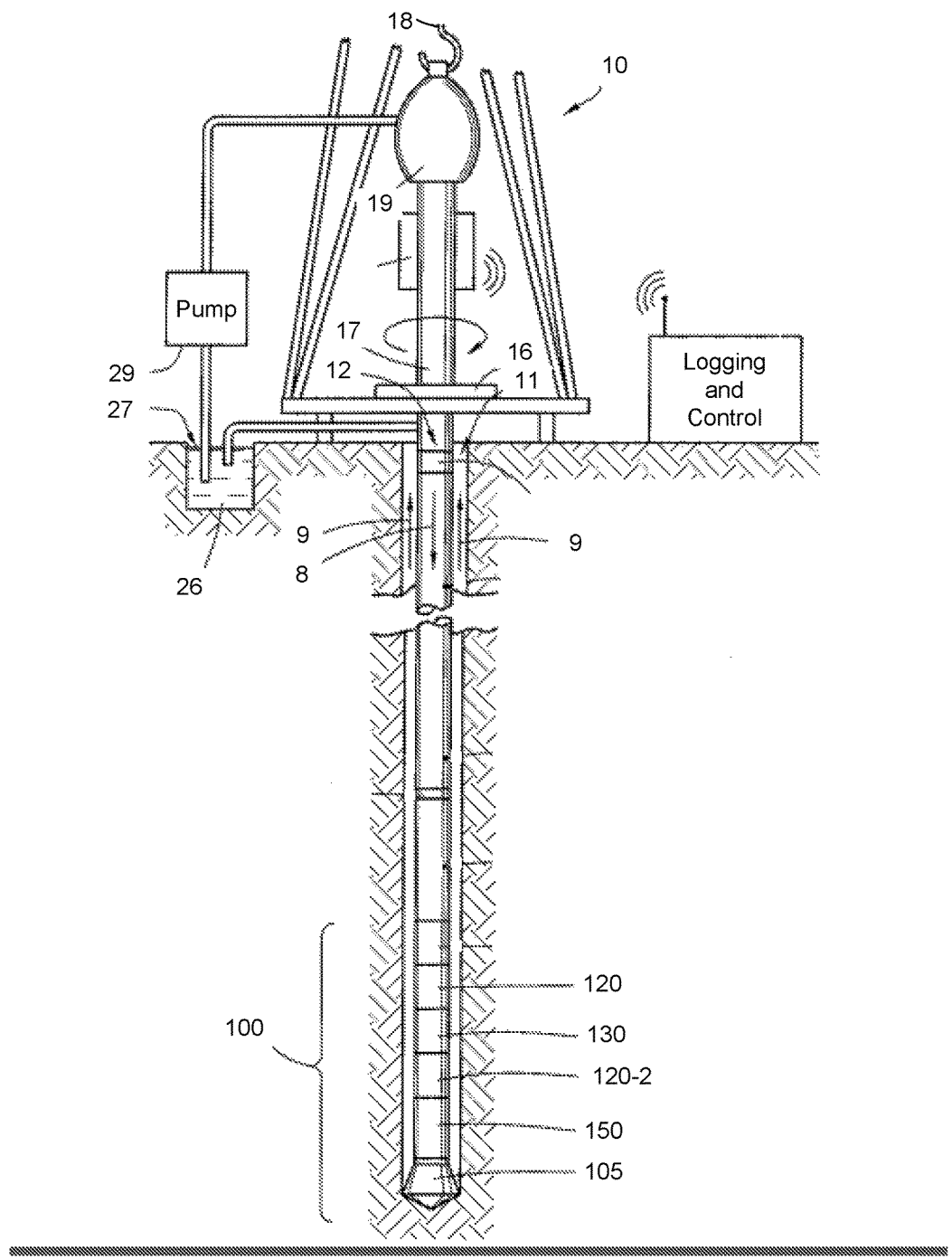
FIG. 1 illustrates an example system for logging data.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

An earthen formation can include layers of media where elasticity of the media may be isotropic, anisotropic or isotropic in certain aspects and anisotropic in others. As an example, crustal rock may be anisotropic yet transversely isotropic "TI" (e.g., locally polar anisotropic). Knowledge of isotropy, anisotropy, etc. can assist with, for example, planning and execution of exploration and development operations of a reservoir or reservoirs within a formation.

As an example of parameters that can characterize anisotropy of media (e.g., seismic anisotropy), consider the Thomsen parameters $\varepsilon$, $\delta$ and $\gamma$ (see, e.g., Thomsen, "Weak elastic anisotropy", Geophysics, Vol. 51, No. 10, pp. 1954-1966, October 1986). The Thomsen parameter $\delta$ describes depth mismatch between logs (e.g., actual depth) and seismic depth. As to the Thomsen parameter $\varepsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\varepsilon$ and $\gamma$ may be estimated from wave data while estimation of the Thomsen parameter $\delta$ involves access to additional information. As noted by Thomsen (1986), the parameter $\delta$ controls most anisotropic phenomena of a medium of interest in geophysics, some phenomena of which are non-negligible even when anisotropy is considered to be weak.

As an example, a method can include estimating δ for a horizontal section of a well in a formation given at least some data over a range of angles (e.g., from about 40 degrees to about 90 degrees) in a formation. In such an example, a relationship between normal and tangential (or shear) compliances (e.g., $B_N$ and $B_T$) may be provided where tangential compliance (e.g., $B_T$) may be cast in terms of elastic coefficients, which may be the same elastic coefficients that define the Thomsen parameter γ.

The Thomsen parameters, as well as other parameters, are germane to various oilfield activities such as well completion, seismic migration velocity model construction, wellbore stability, hydraulic fracturing design and hydraulic fracture monitoring. As an example, as to shale gas reservoirs, knowledge of anisotropy parameters can assist with planning, execution, etc., especially where one or more well configurations may vary over some range between vertical and horizontal.

As an example, to predict and apply one or more parameter values, a method can include acquiring sonic data in two or more deviated wells spanning similar formations (e.g., a layer of a formation); establishing a depth correspondence between the two or more wells by correlating isotropic formation properties (e.g., from neutron logs, gamma-ray logs, etc.); using sonic slowness data from the two or more wells to obtain estimates of seismic anisotropy (e.g., estimates of one or more parameters); identifying correlations between inverted parameters and parameters that can be measured in a horizontal well; and applying the correlations identified to predict unknown parameters along a horizontal well from the measured properties. While such an example mentions two or more wells, consider, as another example, sonic data may be provided for a range of angles (e.g., with respect to a symmetry axis of a TI medium) where the sonic data stems from a single well or multiple wells and one or more parameters may be predicted based at least in part on the sonic data. While various examples mention slowness, velocity may be substituted as slowness and velocity are related.

FIGS. 1 and 2, described below, provide some examples of technologies and techniques that may be employed to acquire sonic data. Various examples of methods, systems, etc., follow, which may include use of sonic data.

FIG. 1 illustrates a wellsite system in which various example embodiments can be employed. The wellsite can be onshore or offshore. In the example system of FIG. 1, a borehole 11 is formed in subsurface formations by rotary drilling in a manner that is well known. Various example embodiments can also use directional drilling, as will be described hereinafter.

A drill string 12 is suspended within the borehole 11 and has a bottom hole assembly 100 that includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (not shown), through the kelly 17 and a rotary swivel 19 which permits rotation of the drill string relative to the hook. As an example, a top drive system may be suitably used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120-2. Where the position of 120 is mentioned, as an example, it may refer to a module at the position of 120-2, etc. The LWD module includes capabilities for measuring, processing, and storing information, as well as for communicating with the surface equipment. In the present embodiment, the LWD module includes a seismic measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may include a mud turbine generator powered by the flow of the drilling fluid, it being understood that other power and/or battery systems may be employed. In the example embodiment of FIG. 1, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2A:
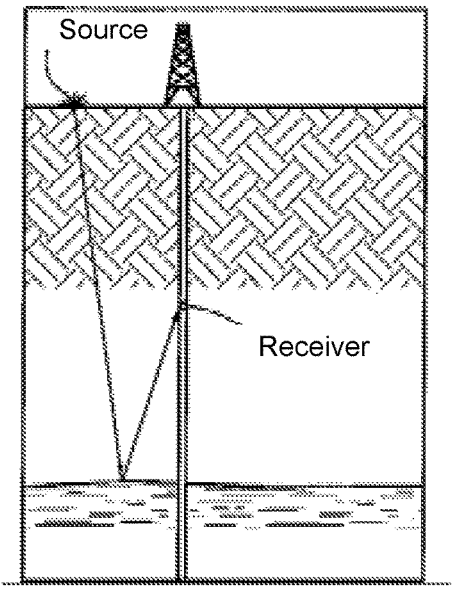
FIGS. 2A-D illustrate examples of sources and receivers.
Figure 2B:
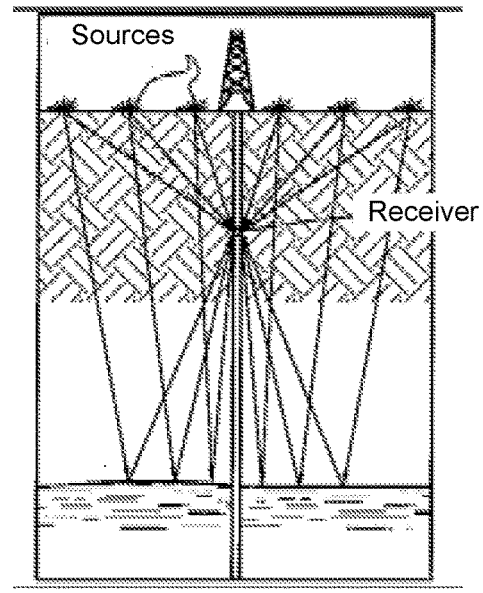
Figure 2C:
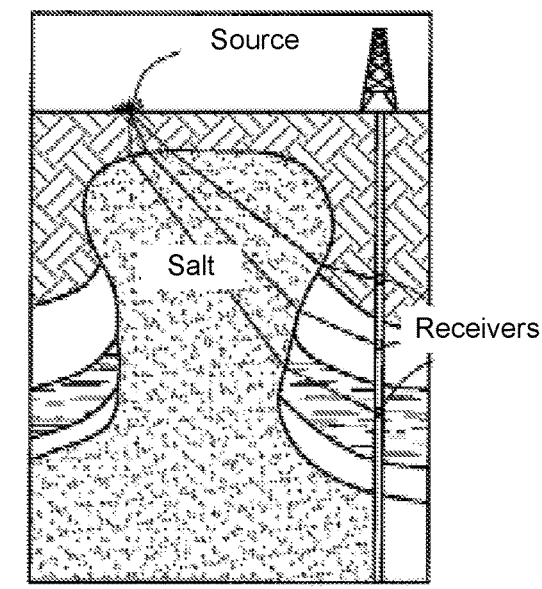
Figure 2D:
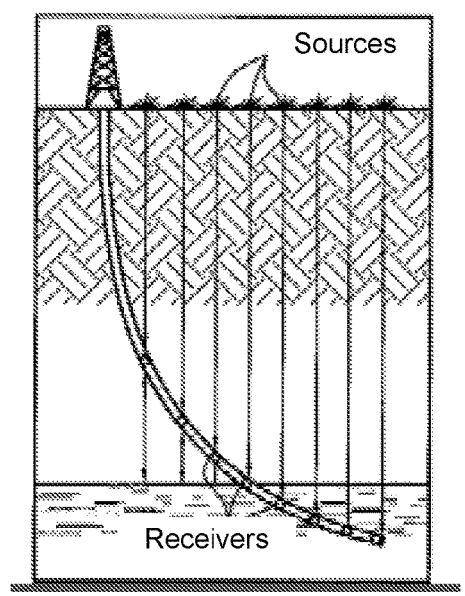

FIGS. 2A, 2B, 2C and 2D illustrates a seismic-while-drilling tool which can be the LWD tool 120, or can be a part of an LWD tool suite 120A of the type disclosed in P. Breton et al., "Well Positioned Seismic Measurements," Oilfield Review, pp. 32-45, Spring, 2002, incorporated herein by reference. The downhole LWD tool can have a single receiver (as depicted in FIGS. 2A and 2B), or plural receivers (as depicted in FIGS. 2C and 2D), and can be employed in conjunction with a single seismic source at the surface (as depicted in FIGS. 2A and 2C) or plural seismic sources at the surface (as depicted in FIGS. 2B and 2D). Accordingly, FIG. 2A, which includes reflection off a bed boundary, and is called a "zero-offset" vertical seismic profile arrangement, uses a single source and a single receiver, FIG. 2B, which includes reflections off a bed boundary, and is called a "walkaway" vertical seismic profile arrangement, uses plural sources and a single receiver, FIG. 2C, which includes refraction through salt dome boundaries, and is called a "salt proximity" vertical seismic profile, uses a single source and plural receivers, and FIG. 2D, which includes some reflections off a bed boundary, and is called a "walk above" vertical seismic profile, uses plural sources and plural receivers.

Figure 3:
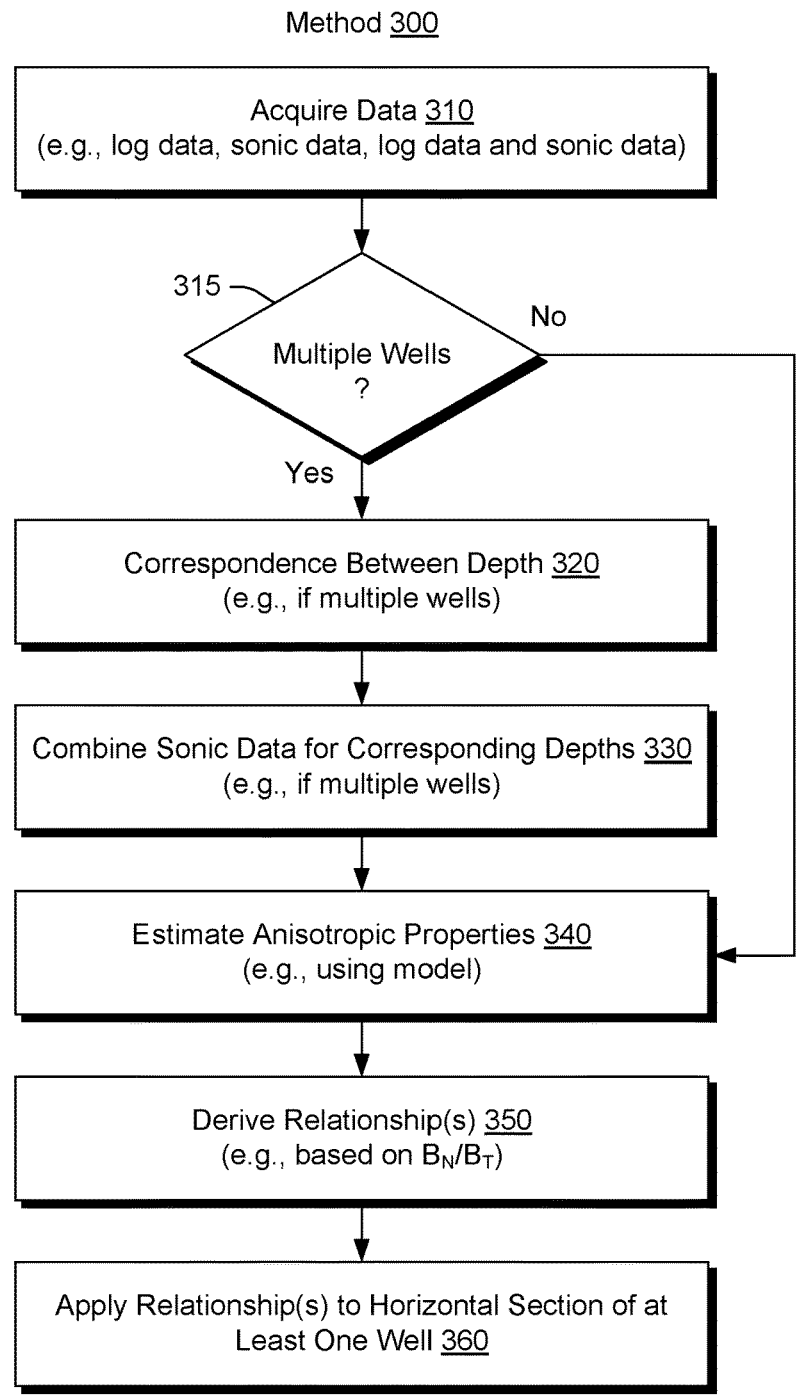
FIG. 3 illustrates an example of a method.

FIG. 3 shows an example of a method 300 for predicting one or more parameters and for applying such one or more parameters. The method 300 includes an acquisition block 310 for acquiring data, a decision block 315 for deciding whether the acquired data are from multiple wells, a correspondence block 320 for establishing depth correspondence for the data between multiple wells (e.g., based on log data such as neutron, gamma-ray, etc.), a combination block 330 for combining sonic data at corresponding depths where the sonic data are from multiple wells, an estimation block 340 for estimating one or more anisotropic properties based at least in part on the sonic data (e.g., one or more anisotropic parameters that characterize a medium or media), a derivation block 350 for deriving one or more relationships (e.g., empirical or other) based at least in part on an estimation of the estimation block 340 (e.g., which may involve applying an inversion process), and an application block 360 for applying the one or more relationships to a medium or media, for example, where the medium or media extends in a horizontal direction (e.g., orthogonal to a symmetry axis of a TI medium).

As an example, the method 300 may include acquiring sonic data in two or more deviated wells spanning similar formations (e.g., a layer of a formation) in the acquisition block 310; deciding that the sonic data are from multiple well in the decision block 315; establishing a depth correspondence between the two or more wells by correlating isotropic formation properties (e.g., from log data such as neutron log data, gamma-ray log data, etc.) in the correspondence block 320 and in the combination block 330; using sonic slowness data from the two or more wells to obtain estimates of seismic anisotropy in the estimation block 340; identifying correlations between inverted parameters (e.g., per the estimation block 340) and parameters that can be measured in a horizontal well in the derivation block 350; and applying the correlations identified to predict unknown parameters along a horizontal well from the measured properties in the application block 360. While such an example mentions two or more wells, consider, as another example, that sonic data may be provided for a range of angles (e.g., with respect to a symmetry axis of a TI medium) where the sonic data stems from a single well or multiple wells and one or more parameters may be predicted based at least in part on the sonic data.

Figure 4A:
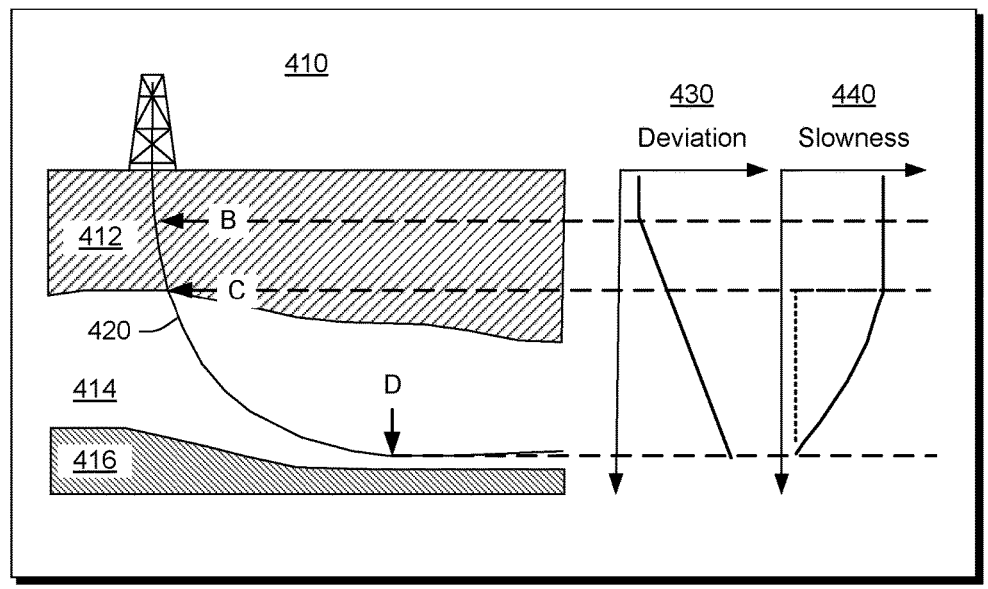
FIGS. 4A-B illustrate an example of slowness behavior for a deviated well in an anisotropic formation.

FIG. 4A shows a schematic cross section through earth 410 as including a target formation 414 between an upper formation 412 and a lower formation 414. As indicated, a single deviated well 420 enters the target formation 414 at a near vertical angle (labeled C) which then deviates towards the horizontal direction (labeled D). A plot 430 shows deviation of the well 420 as a function of depth where some deviation occurs between B and C and further deviation occurs between C and D (i.e., within the target formation 414). Such wells may be drilled in low permeability unconventional gas reservoirs (e.g. Haynesville Shale, Barnett Shale etc.). If well log measurements are taken over the deviated sections of the well 420 (e.g., from label B to C, and C to D) the response may vary, even though the formation is homogeneous, because of a phenomenon known as anisotropy.

In the example of FIG. 4A, the upper formation 412 may be referred to as overburden, which may be isotropic such that over the deviated section of the well 420 (from B to C) the slowness does not change because the upper formation 412 is homogeneous and isotropic. However, in the target formation 414, the well 420 deviation changes (from C to D) and, even though the target formation 414 is homogeneous, the slowness (see plot 440) changes because the target formation 414 is to some extent anisotropic. In a scenario where the target formation 414 had been completely isotropic, the measured slowness would have remained constant over the target formation 414 (see, e.g., dotted line the plot 440) for the entire portion of the well 420 within the target formation 414.

Figure 4B:
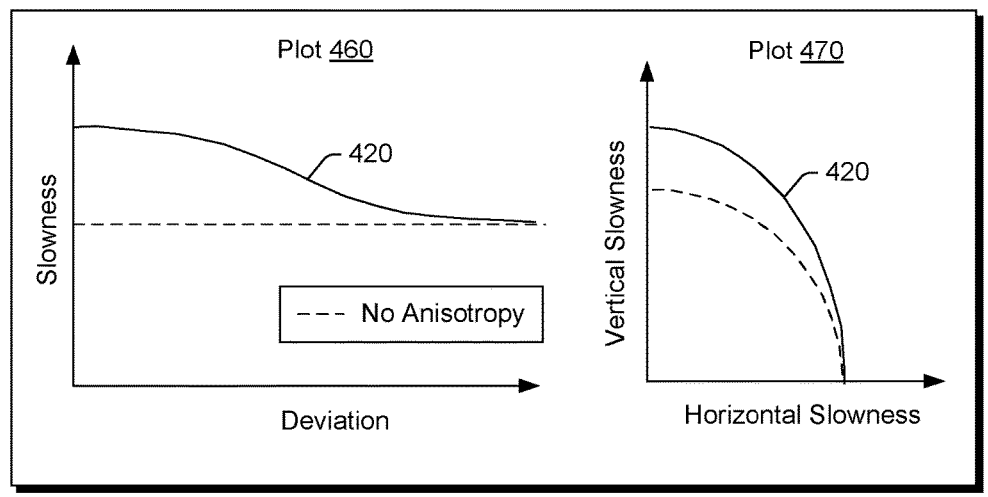

In FIG. 4B, plots of slowness versus deviation 460 and vertical slowness versus horizontal slowness 470 are shown. In the plots 460 and 470, slowness data measured over the deviated well section in the case that the formation is anisotropic is shown by a solid line while that for an isotropic formation (i.e., no anisotropy) is shown by a dotted line. The plot 460 shows the slowness data on the vertical axis and the well deviation on the horizontal axis. The same data is shown in the plot 470 using a polar representation where the isotropic behavior traces out a circular segment (e.g., in contrast to a somewhat elliptical segment for the anisotropic example).

Thus, differences between isotopic and anisotropic behaviors can be shown by plotting slowness data as a function of well deviation. From an analysis of these slowness variations with well deviation, it is possible to estimate some of a formation's elasticity parameters; noting that such parameters may be useful in various oilfield activities such as well completion, wellbore stability, hydraulic fracturing design, hydraulic fracture monitoring and pre-stack depth migration.

Figure 5A:
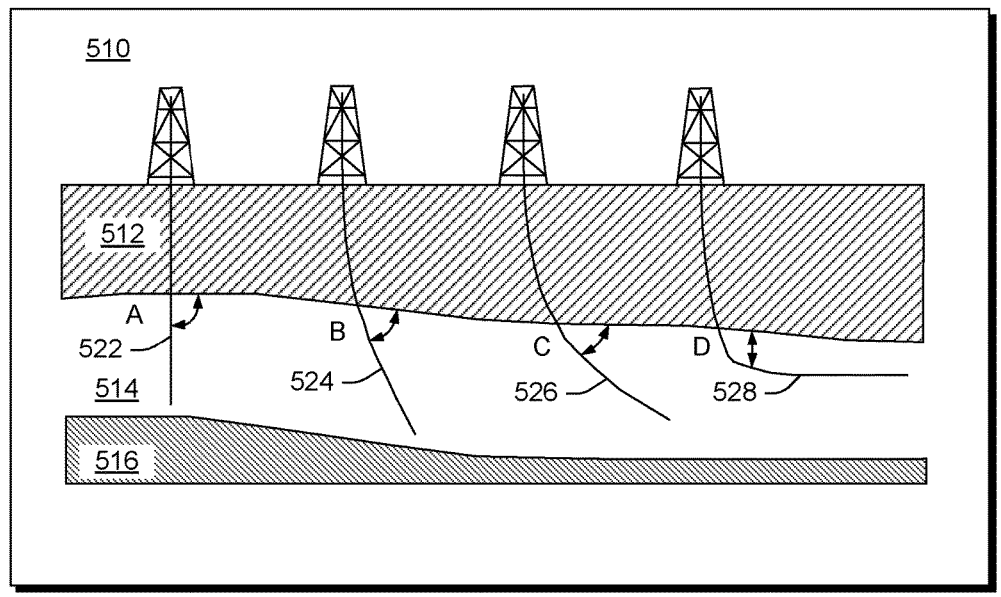
FIGS. 5A-B illustrate an example of slowness behavior for deviated wells in an anisotropic formation.

Sonic data recorded in deviated wells tend to be sensitive to elastic anisotropy resulting in angle dependent velocity measurements. As an example, compressional sonic measurements from multiple deviated wells within the same formation may be used to estimate elastic anisotropy. FIG. 5A shows a schematic cross section through earth 510 as including a target formation 514 between an upper formation 512 and a lower formation 514. Disposed within the target formation 514 are various wells 522, 524, 526, and 528, each having an overall angle ranging from about 0 degrees to about 90 degrees, for example, with respect to a vertical direction (0 degrees) that may correspond to a symmetry axis for a predominant medium of the target formation 514.

Figure 5B:
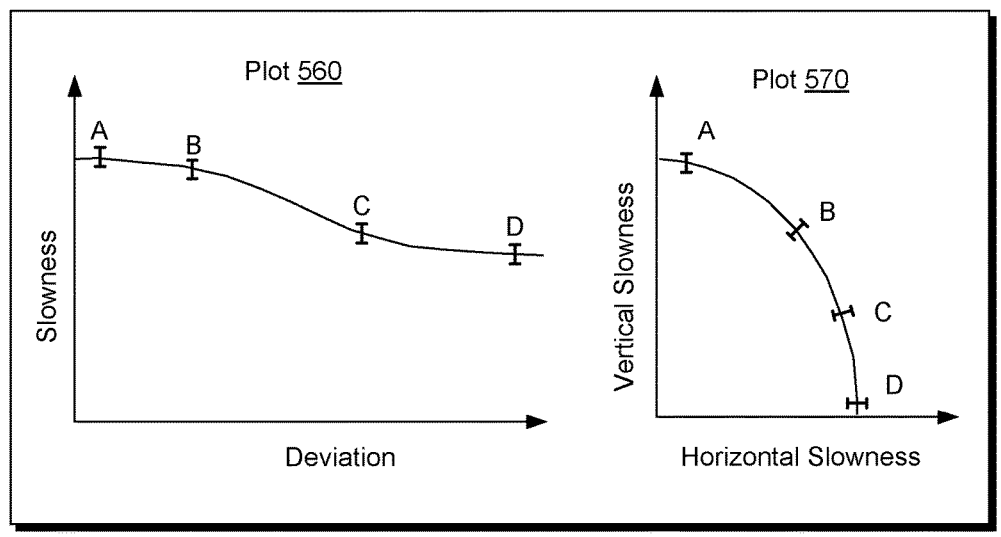

In the example of FIG. 5A, a method can include a multi-well approach for estimating formation anisotropy from multiple wells acquired at different angles through the same formation (i.e., discrete angles, one angle for each of the multiple wells). In such an example, slowness data from such wells can be extracted as a function of the well deviation as shown in plots 560 and 570 of FIG. 5B, from which anisotropy parameters of the formation 514 can be estimated. In the example of FIGS. 5A and 5B, the four wells 522, 524, 526 and 528, each having a discrete angle (see, e.g., labels A to D), are shown penetrating the anisotropic formation 514. The plots 560 and 570 show the averaged formation slowness data plotted as a function of the well deviation for the four discrete angles (e.g. one of which is approximately 0 degrees and another of which is approximately 90 degrees). Since the formation 514 is anisotropic the slowness varies as a function of well deviation.

As an example that corresponds to a scenario as illustrated in FIGS. 5A and 5B, an algorithm may use a least squares measure between observed P-wave velocities as a function of well deviation relative to a bedding plane (e.g., a flat, horizontal plane) and model P-wave group velocities for an anisotropic model. Such an anisotropic model may then be modified until a difference between observed and modeled compressional sonic data is minimized.

Another approach for the same scenario may rely on having data within three specified angular ranges (i.e., near vertical, near horizontal and around 45 degrees). For the near vertical and near horizontal angles/directions there exist analytical expressions for the group velocities from which certain elastic constants can be estimated. However, for the data at 45 degrees, an assumption may be made that the phase angles are not very different than the group angles. Such an assumption can give rise to the following two points: firstly, data are to be available in the vertical and horizontal directions (e.g., vertical borehole angle and horizontal borehole angle with respect to a VTI symmetry axis); and, secondly, the group angles being close to the phase angles may not be valid, for example, because of complications in the qSV wave behavior for certain combinations of elastic constants.

As to another approach, sonic data including P-, S- and tube wave (e.g., "Stoneley wave") data can be used to estimate elastic anisotropy parameters. Such a technique relies on inclusion of data from a well that is substantially vertical (see, e.g., the well 522 in FIG. 5A). Such an approach uses a weak anisotropy plane wave (phase) velocity expression that may be, at times, inappropriate, especially for qSV data where triplications can occur. In the aforementioned approach, P, SV and SH sonic data from a vertical pilot hole along with data from a deviated sidetrack well can be used to estimate the average anisotropy over a formation.

As to yet another approach, shear wave data from a single well can be analyzed in terms of an "apparent anisotropy" computed from a difference in SV and SH velocities. In such an approach, the shape of the apparent anisotropy as a function of well deviation allows for identification of three different regimes related to the difference in two of the Thomsen parameters $\varepsilon$ and $\delta$.

As an example, the method 300 may include shear wave data as part of an estimation process, optionally include tube wave (e.g., Stoneley wave) data, and provide for prediction of one or more parameters to characterize a formation (e.g., a medium) without making an assumption that anisotropy is "weak" (see, e.g., Thomsen 1986). Further, the method 300 may allow for estimation of one or more subsets of elastic constants (e.g., or equivalent parameters) using one or more of the following data sets: P, SV, SH, Tube/Stoneley (e.g., including qP, qSV, etc.). As an example, the method 300 may be applied where lateral homogeneity exists (e.g., without applying a condition that vertical homogeneity exists).

Figure 6A:
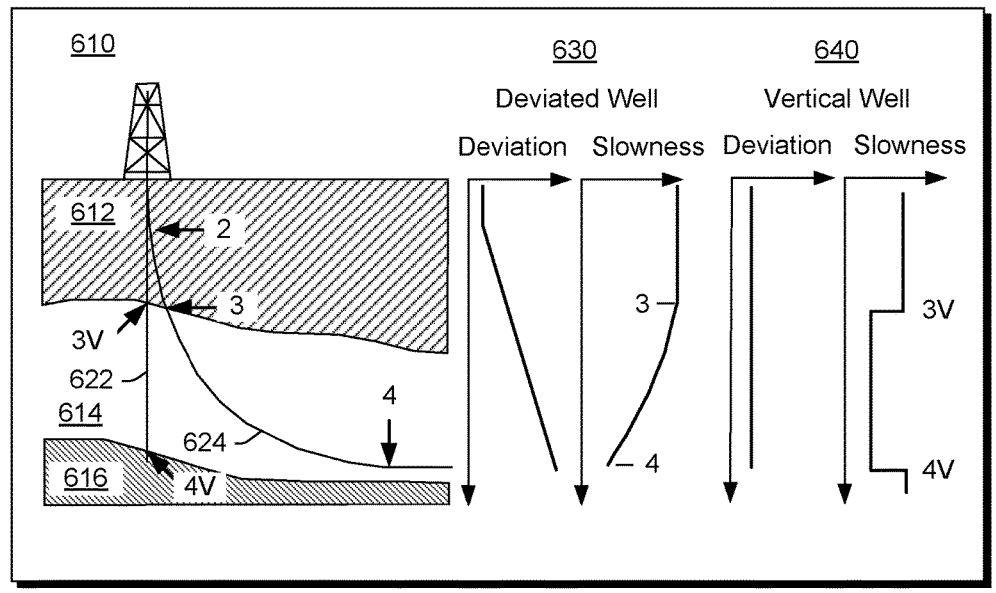
FIGS. 6A-B illustrate an example of slowness behavior for a vertical well and a deviated well in an anisotropic formation.

As an example, a method can include using sonic data from a pilot well (e.g., optionally vertical) and a build section of a deviated well (e.g., a bend section). FIG. 6A shows a schematic cross-section through earth 610 as including a target formation 614 between an upper formation 612 and a lower formation 614. Disposed within the target formation 614 are two wells 622 and 624 where the well 622 is substantially vertical (e.g., 0 degrees) and where the well 624 is deviated by having a bend that spans a range of angles that lie within a range from about 45 degrees to about 90 degrees (e.g., within a range of 40 degrees to 90 degrees), for example, with respect to a vertical direction (0 degrees) that may correspond to a symmetry axis for a predominant medium of the target formation 614 (e.g., a TI medium). FIG. 6A also shows plots 630 of deviation and slowness versus depth for the deviated well 624 and plots 640 of deviation and slowness versus depth for the well 622. In the example of FIG. 6A, the well 622 may be a pilot hole while the deviated well 624 may be a production well.

FIG. 6A show various labels for the wells 622 and 624 where, for example, the deviated section of the well 624 (e.g., from point 2 to point 4) does not lie entirely within the target formation 614; thus, a limited range of angles are available within the target formation 614. Yet, in the deviated section of the well 624 within the target formation 614 (e.g., from point 3 to point 4), the angles are greater than those in the overburden (e.g., the upper formation 612). As an example, data from the well 622 (e.g., vertical pilot) (e.g., from point 3V to point 4V) can be used to obtain information relating to the target formation 614 near vertical directions (e.g., angles at or near 0 degrees). Where a data set exists for the well 622 (e.g., within the target formation 614) and another data set exists for the well 624 (e.g., within the target formation 614), a method can include combining these two data sets to improve estimation of one or more anisotropic properties of the target formation 614.

Figure 6B:
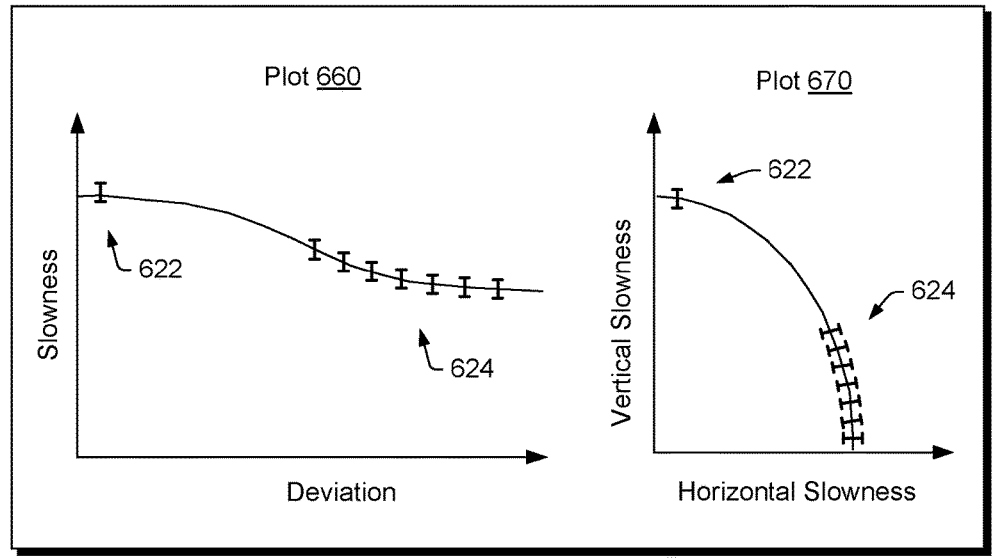

FIG. 6B shows plots 660 and 670 of combined data, which may be compared to the plots 560 and 570 of FIG. 5B. In the plots 660 and 670, data exist for vertical slowness at or near 0 degrees deviation and data exist along a bend portion for deviations greater than about 45 degrees to about 90 degrees (e.g., within a range of 40 degrees to 90 degrees). Again, the plots 560 and 570 of FIG. 5B show data for four discrete angles (i.e., for the wells 522, 524, 526 and 528) that include vertical and horizontal (i.e., leaving two data points for two angles between vertical and horizontal). In the plots 660 and 670 of FIG. 6B, as an example, seven points with associated data are shown for angles greater than about 45 degrees.

As an example, given a vertical well and a deviated well with a bend portion with deviations greater than about 40 degrees to about 90 degrees (e.g., including data for about 45 degrees and data for additional, greater angles), both within a formation, a correspondence in depth for the two wells may be established between by correlating one or more appropriate log properties. In such an example, sonic data from the vertical well at a single depth can be combined with sonic data from the deviated well at a corresponding depth in the formation. These combined sonic data (e.g., sonic measurements as to waves) can be used to estimate elastic properties of the formation at that depth. Having obtained anisotropy estimates, correlations can be established between (a) parameters with values that can be measured in a horizontal section of the formation (e.g., in the deviated well) and (b) properties that are unknown. One or more relationships based on the correlations (e.g., between measurable parameters and unknown properties) can then be used to predict one or more of the unknown properties of the formation along a horizontal section of the formation from measured values for parameters, as measured for the formation.

As an example, sonic data can be obtained using wireline measurements, using LWD measurements or other technique. In a deviated well section within a formation, sonic data are sensitive to anisotropic effects such that the formation's slowness is measured as a function of angle of the deviated well section (e.g., at various depths for a single deviated well). These variations in slowness measurement values can be used to estimate the formation's elastic properties and related attributes. Such information is useful for various oilfield activities such as well completion design, avoiding wellbore instability, determining the landing points for lateral wells in unconventional resources such as shales, designing hydraulic fractures, and the monitoring of hydraulic fractures from micro-seismic events.

Elastic properties of many types of rock may be approximated by so-called Vertical Transverse Isotropy (VTI or TI). Physical properties of a VTI material are theoretically identical when measured with respect to a direction known as the symmetry axis. In the case of many sedimentary rocks layering tends to be horizontal and the resulting symmetry axis is vertical. For such a system the elastic stiffness tensor can be described using five elastic coefficients: $C_{11}$, $C_{33}$, $C_{44}$, $C_{66}$ and $C_{13}$. The foregoing five elastic coefficients correspond to coefficients of the stress tensor given a so-called "compact representation" (see, e.g., Voigt compact representation 940 of FIG. 9).

The five elastic coefficients describe velocity variation for three different wave types, the quasi compressional wave (qP), the quasi shear wave polarized in the vertical plane (qSV) and a true shear wave polarized in the horizontal plane (SH). The behavior of the qP and qSV waves is controlled by the $C_{11}$, $C_{33}$, $C_{44}$ and $C_{13}$ elastic coefficients, which may be referred to as parameters of a formation. As to behavior of a SH wave, it is controlled by values of the coefficients $C_{44}$, and $C_{66}$.

As an example, a model may be defined on the basis of elastic coefficients (e.g., or subsets thereof). Acquired sonic data (e.g., in a vertical pilot well and a deviated production well or other scenario) may be referred to as model data. As an example, through use of such a model and data, a method can include estimating values of the elastic coefficients or appropriate equivalents thereof from sonic data measured in a vertical section of a well (e.g., a pilot well) and a bend section of a well (e.g., a deviated production well).

Given a model that describes anisotropy of a formation, synthetic data may be computed. Given measured data from a vertical section of a well in a formation and a bend section of a well in the formation (e.g., or data from another arrangement), a matching process may be performed that matches the synthetic data to the measured data. Such a matching process can include modifying the model (e.g., one or more model parameters, which can include one or more of the aforementioned five elastic coefficients or equivalents thereof) to minimize a difference (or differences), which may be a difference (or differences) between at least some of the measured data and at least some of the synthetic data.

As to a model to compute (e.g., generate) synthetic data, as an example, a three-dimensional finite difference technique may be implemented. Mallan et al., 2011, "Simulation of borehole sonic waveforms in dipping, anisotropic, and invaded formations," (Geophysics, Vol. 76, No. 4, pp. E127-E139), which is incorporated by reference herein, describes an example of a three-dimensional finite difference time difference (3D FDTD) technique that was applied to formations with TI symmetry where compressional wave and shear-wave velocities were equated with individual ones of the elastic coefficients $C_{11}$, $C_{33}$, $C_{44}$, and $C_{66}$ while the elastic coefficients $C_{12}$ and $C_{13}$ were derived from combinations of the elastic coefficients $C_{11}$ and $C_{66}$ and $C_{33}$ and $C_{44}$, respectively. The 3D FDTD technique provides for numerical simulation of borehole sonic measurements using a Cartesian coordinate system. The 3D FDTD solves coupled velocity-stress differential equations that include a 3D velocity vector and stress and strain tensors related using a fourth-rank stiffness tensor that describes a TI medium (i.e., with elastic coefficients $C_{11}$, $C_{33}$, $C_{44}$, $C_{66}$ and $C_{13}$). The 3D FDTD includes discretizing equations using a staggered-grid, second-order central finite differences in both space and time. As an example, a FD grid with 1260×181×92 cells was used for z, x and y directions, respectively. The article by Mallan et al. presents simulation results for a vertical well with sonic energy characterized as having a circular, piston-shaped invasion front. The article also presents simulation results for a deviated well to examine the effects of dipping TI. As an example, a 3D FDTD technique may be implemented to compute full waveform data (e.g., synthetic data), which can then be matched to observed waveforms (e.g., measured waveform data).

As an example, the aforementioned 3D FDTD technique may be employed to compute synthetic data. In such an example, instructions embodied in a computer-readable storage medium may be executed by one or more processors of a computer to compute synthetic data. As indicated, the 3D FDTD can include various coefficients, variables, etc. Where a method includes minimizing difference (or differences) between synthetic data and measured data, one or more coefficients, variables, etc., of a model may be adjusted in an effort to minimize such difference (or differences). Further, as may be appreciated, one or more coefficients, variables, etc., may depend on depth. For example, as measure data may depend on depth, a model may include coefficients, variables, etc., that depend on depth to allow for matching (e.g., minimizing one or more differences).

As mentioned, a method may include matching of computed, synthetic waveform data with measured waveform data. As another example, velocities may be computed using a model that models the velocities as from a point source (e.g., group velocities) located in a homogeneous medium. As an example, for the case of weak anisotropy, a model that models plane-wave velocities (e.g., "phase velocities") located in a homogeneous medium may be appropriate for providing synthetic data (e.g., and for matching, minimizing, etc.).

For materials possessing TI anisotropy, analytical expressions exist for the plane-wave ("phase") velocity variations (see, e.g., Thomsen, 1986). Such plane-wave velocity expressions can be appropriate in the case that an energy source excites plane waves or the anisotropy is weak. In the case that the source is more accurately represented as a point source, then the velocities that are measured are group velocities for which no conforming analytical expression exists to compute the qP and qSV group velocities for a given group direction. These "point-source" (group) velocities may however be computed for a given plane-wave direction by solving the Kelvin-Christoffel equation and then computing the group velocity vector whose direction gives the group direction (see, e.g. Musgrave, 1970, *Crystal Acoustics*, Holden-Day, San Francisco; Auld, 1990, *Acoustic Fields and Waves in Solids*, Krieger Publishing Company, NY).

In the case of dipole sonic logs it has been shown the velocities that are measured are the group velocities (Hornby et al., 2003, Do we measure phase or group velocity with dipole sonic tools?, 65th EAGE Conference, Extended Abstracts, F-29). As an example, a method can include construction of a lookup table of point-source (i.e., "group") velocity vectors sampled over many different directions for a model. In such an example, the look up table can then be searched to find the point-source (i.e., "group") directions that are close to a vertical section direction (e.g., of a pilot or other well) and bend directions (e.g., of a deviated well, which may be a production well) of measured data. The computed point-source (i.e., "group") directions (e.g., based at least in part on a look up table search) can then be compared to measured sonic data using, for example, an objective function. As an example of an objective function, consider the following equation:

$$f(m) = \sum_{i=1}^{N} \left| \frac{V_{Obs,i} - V_{Syn,i}}{\Delta V_i} \right|$$

where m is a model describing a formation's elastic properties, N is a number of data points that have been processed from a sonic log, $V_{Obs,i}$ are observed velocities and $V_{Syn,i}$ are the corresponding synthetic velocities computed for the given model and the given well deviation. While the foregoing equation include velocities, slownesses may be substituted (e.g., or other appropriate variables that comport with the data).

As an example, after a method obtains an optimal match between measured data and synthetic data computed by a model, then the model may be used for various purposes. For example, the anisotropy parameters can be used in constructing a velocity model for use in locating microseismic events induced by hydraulic fracturing operations. As an example, an approach described by Erwemi et al., 2010, "Anisotropic velocity modeling for microseismic processing: Part 3—borehole sonic calibration case study" (2010 SEG Annual Meeting, Denver, Colo., Expanded Abstracts 29, pp. 508-512), may be employed in conjunction with a matched model (e.g., a model matched using measured data and synthetic data).

As another example, a matched model may be implemented by a method that uses computed anisotropy parameters to compensate or adjust sonic log data for a well deviation (see, e.g., Hornby et al., 2003, "Anisotropy correction for deviated-well sonic logs: Application to seismic well tie," Annual International Meeting, SEG No. 69, Vol. 68, No. 2, pp. 464-471).

As yet another example, a matched model may be implemented by a method to compute attributes related to anisotropy. In such an example, an attribute can be the $B_N/B_T$ ratio (Sayers, 2008, "The effect of low aspect ratio pores on the seismic anisotropy of shales," 2008 SEG Annual Meeting, Las Vegas, Nev., Expanded Abstracts 27, pp. 2750-2754), which has been shown to be related to gas saturation in shales. The ratio $B_N/B_T$ can describe or characterize deformation of interparticle regions of a medium under an applied stress. According to Sayers (2008), where an assumption is made that a medium is composed of aligned clay particles, the Thomsen parameter $\gamma$ can be modeled as depending on properties of interparticle regions through the tangential (or shear) compliance $B_T$.

Referring again to the method 300 of FIG. 3, as an example, the ratio $B_N/B_T$ may be used in a derivation procedure that derives a relationship (see, e.g., derivation block 350). In such an example, estimation of the $B_N/B_T$ ratio can be applied to predict one or more anisotropic parameters in a horizontal well drilled within a VTI formation. For example, in the method 300 of FIG. 3, the application block 360 may apply the $B_N/B_T$ ratio as a derived relationship to a horizontal section of at least one well to predict one or more anisotropic parameters where the one or more anisotropic parameters includes the Thomsen parameter $\delta$ or an equivalent thereof.

Figure 9:
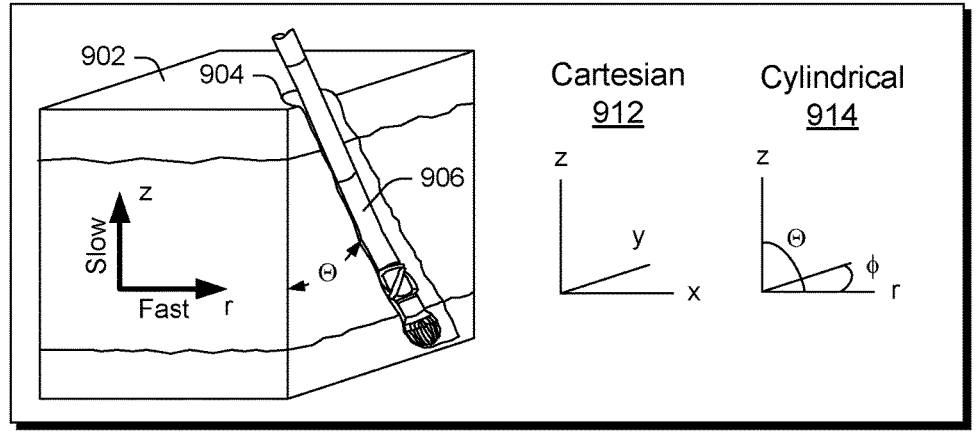
FIG. 9 illustrates examples of equations related to a formation.

As to the normal and tangential (or shear) compliance parameters $B_N$ and $B_T$, $B_T$ may be defined in terms of the elastic coefficients $C_{44}$ and $C_{66}$, which are the same elastic coefficients that can be used to define the Thomsen parameter $\gamma$; however, noting that the compliance parameters $B_N$ and $B_T$ have units of inverse pressure while the Thomsen parameter $\gamma$ is unit-less. Thus, if the Thomsen parameter $\gamma$ is known (i.e., being associated with a horizontal section of a well), or more particularly if $C_{44}$ and $C_{66}$ are known, it becomes possible to determine $B_T$ (e.g., as being based on $C_{44}$ and $C_{66}$) and, from a relationship between $B_T$ and $B_N$, it becomes possible to determine $B_N$. As to $C_{44}$ and $C_{66}$, as mentioned, values for these elastic coefficients can be determined from data for shear wave slowness (e.g., $S_{SH}$ and $S_{SV}$ or $S_{qSV}$) and density (see, e.g., FIG. 10). With $B_N$ and $C_{11}$ known, it becomes possible to determine the elastic coefficients $C_{13}$ and $C_{33}$. As to $C_{11}$, it may be determined, for example, from compressional slowness (e.g., $S_P$ or $S_{qP}$) and density along a horizontal section of a well (see, e.g., FIG. 10). Thus, through a relationship between $B_T$ and $B_N$, values can be provided for the five elastic coefficients $C_{11}$, $C_{13}$, $C_{33}$, $C_{44}$ and $C_{66}$. As indicated in FIGS. 9 and 10, values for these five elastic coefficients allows for determination of the Thomsen parameters $\varepsilon$, $\delta$ (or $\delta^*$) and $\gamma$. As noted by Thomsen (1986), of these three parameters, there is particular interest in the Thomsen parameter $\delta$ (e.g., of $\delta^*$), which can characterize near vertical P-wave speed variations, angular dependence of SV-wave speed, etc. Knowledge of the Thomsen parameter $\delta$ (e.g., of $\delta^*$) can be helpful for various reasons (e.g., depth imaging/effects, media characterization, media composition, etc.).

As an example, given one or more calculated values for one or more horizontal section anisotropic parameters (e.g., including the Thomsen parameter $\delta$ or an equivalent thereof) for a formation, a method can include prediction of future production of the formation. As another example, a determination may be made as to total organic content (TOC) in shales (i.e., where a formation is a shale formation). Such an example may employ a correlation between TOC and shale anisotropy parameters (e.g., noted by Sondergeld et al., 2000, "Ultrasonic measurement of anisotropy on the Kimmeridge Shale," 2000 SEG Annual Meeting, Calgary, Alberta, Expanded Abstracts 19, pp. 1858-1861). Referring again to the method 300 of FIG. 3, such a method may output one or more values that can be used to compute indications of (or even measurement of) TOC.

An example is described below where a model is used to compute synthetic data. Synthetic data are generated for two wells using a model that models the wells as a vertical pilot well and a deviated production well with a constant build rate of 12 degrees per 30 m resulting with the production well turning from vertical to horizontal over a vertical depth range of less than 150 m. Over the deviated well section the formation is assumed to be homogeneous with the following elastic properties: vertical P-wave velocity of 4000 m/s, vertical S-wave velocity of 2000 m/s, Thomsen $\varepsilon$ of 0.3, Thomsen delta of 0.1, Thomsen $\gamma$ of 0.3 and density of 2.09 g/cm$^3$. The properties of the fluid in the borehole are fluid velocity of 1500 ms and fluid density of 1.5 g/cm$^3$.

Figure 7A:
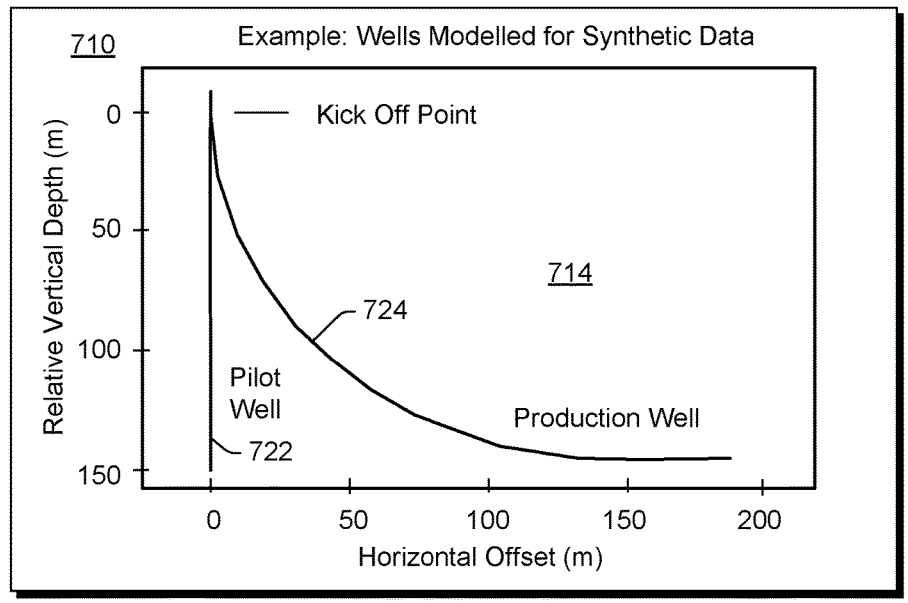
FIGS. 7A-B illustrate examples of model computed synthetic data for a pilot well and a deviated production well.
Figure 7B:
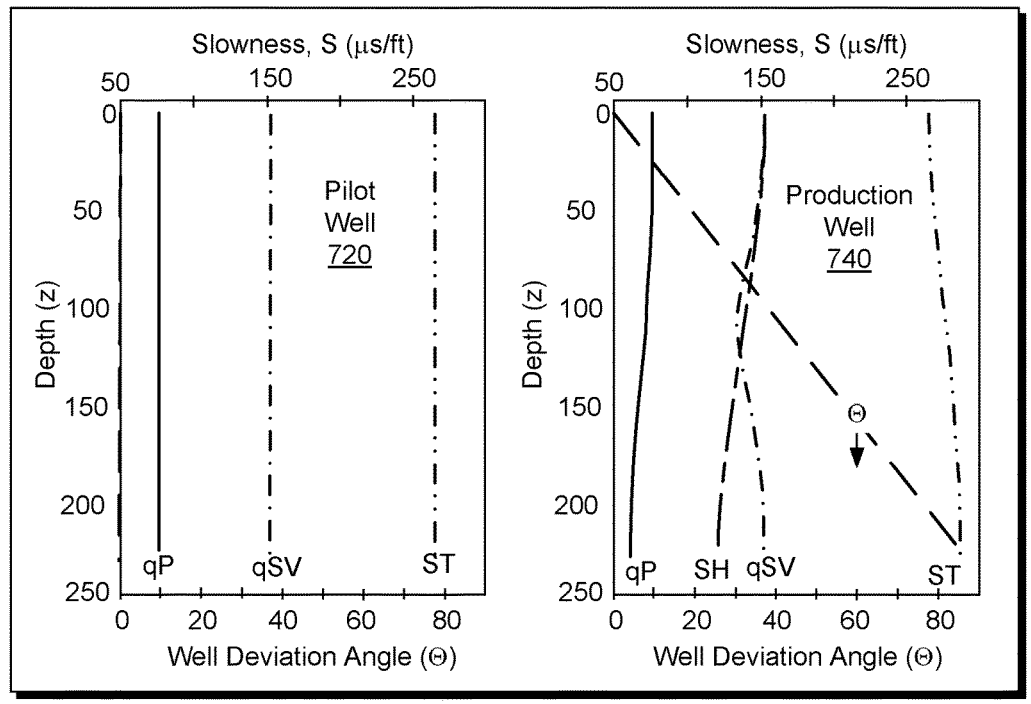

FIG. 7A shows a plot 710 of relative vertical depth in meters versus horizontal offset in meters for the aforementioned pilot well 722 and production well 724 in the assumed homogeneous formation 714. FIG. 7B shows plots 720 and 740 of synthetic data (e.g., sonic data) for the vertical pilot well 722 and the deviated production well 724, respectively. The plots 720 and 740 show slowness (upper scale) versus depth as well and well angle deviation (lower scale) versus depth. For the production well 724, as shown in the plot 740, the quasi compressional wave (qP) and the horizontally polarized shear wave (SH) exhibit decreasing slowness as the production well 724 changes angle from vertical to horizontal. Since these velocity changes occur over a homogeneous formation (i.e., the formation 714), these changes are due to anisotropic effects. From these synthetic data, or subsets of, of qP, qSV, SH and low frequency Stoneley wave (also known as a tube wave), sonic data can be extracted over the deviated well section of the production well 724 and one or more anisotropy parameters estimated. As to the plot 720, as the formation 714 is homogeneous and the pilot well 722 is vertical, values for qP, qSV and ST, with respect to depth, do not change.

Figure 8:
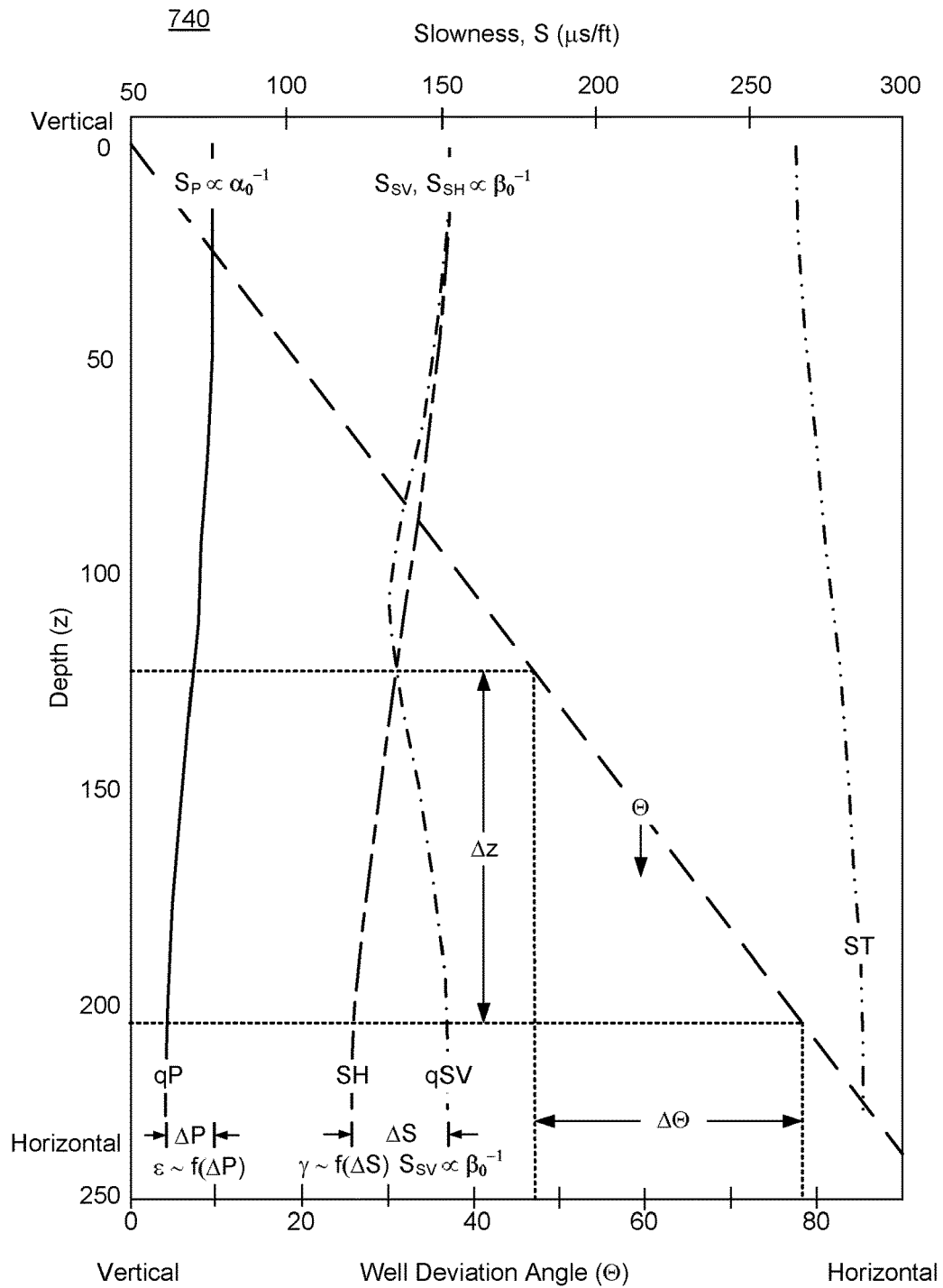
FIG. 8 illustrate the model computed synthetic data of the deviated production well of FIGS. 7A-B.

FIG. 8 shows the plot 740 of FIG. 7 of synthetic data, enlarged with additional labels. Specifically, labels are included for $\alpha_0$, $\beta_0$, $\varepsilon$, $\gamma$, $\Delta z$ and $\Delta \Theta$. As shown, for a span of depth $\Delta z$ corresponds to a span of angle $\Delta \Theta$ ranging from about 45 degrees to about 80 degrees (e.g., within a range of 40 degrees to 90 degrees). Over these ranges, synthetic data values for SH and qSV change where the difference between these values ($\Delta S$) at horizontal (i.e., about 90 degrees or $\pi/2$) relates to the Thomsen parameter $\gamma$, for example, consider the equation $\gamma=(v_{SH}(\pi/2)-\beta)/\beta_0$ where $v_{SH}(\pi/2)$ is the horizontal velocity for shear wave SH and where $\beta_0$ is the vertical sound speed for shear waves (e.g., $v_{SV}(0)$, $v_{SH}(0)$). Further, for qP, a change in value occurs from vertical (i.e., about 0 degrees) to horizontal (i.e., about 90 degrees) where the change ($\Delta P$) relates to the Thomsen parameter $\varepsilon$, for example, consider the equation $\varepsilon=(v_P(\pi/2)-\alpha_0)/\alpha_0$ where $v_P(\pi/2)$ is the horizontal velocity for compressional wave P (e.g., qP) and where $\alpha_0$ is the vertical sound speed for compressional waves (e.g., $v_P(0)$). In the plot 740, anisotropy parameters $\alpha_0$ and $\beta_0$ are shown with respect to slowness, noting that slowness and velocity are reciprocally related. Specifically, the parameter $\alpha_0$ is shown as being approximated by a slowness value for qP at vertical and the value of the parameter $\beta_0$ is shown as being approximated by a slowness value or values of SH at vertical and qSV at vertical and horizontal. In the plot 740 of the synthetic data, the span $\Delta \Theta$ may be referred to as a sweet spot: a range of angles where sonic data exhibits a changing difference between SH and qSV due to anisotropy of a formation (e.g., in terms of slowness or velocity).

As to an example where measurements may be made, FIG. 9 shows an example of layered earth 902 with a deviated well 904 and a well tool 906 along with a Cartesian coordinate system 912 and a cylindrical coordinate system 914. In such an example, the well tool 906 may include features for taking measurements (e.g., as a receiver, a transmitter, a receiver and transmitter, etc.); noting that various examples also appear in FIGS. 1 and 2. In the Cartesian coordinate system 912, a stress tensor 920 may be defined as being represented in part by elastic coefficients. As mentioned, a Voigt compact representation 940 may recast the elastic coefficients to reduce an overall number of the coefficients. Such a representation may also recast the indexes i, j, k and l in terms of $\alpha$ and $\beta$, for example, to arrive at an elastic modulus matrix $C_{\alpha\beta}$ 960. As shown in FIG. 9, the Thomsen parameters 980 may be case in terms of various elastic coefficients of the elastic modulus matrix 960.

FIG. 10 shows example equations for wavefront velocities and the Thomsen parameter $\delta$ 1020 and various example equations for vertical and horizontal wavefronts 1040. In the equations 1040, "v" refers to velocity while "S" refers to slowness. The equations 1040 may be compared with the plot 740 of FIGS. 7 and 8 for an understanding of how various coefficients, variables, etc., relate to slowness data (e.g., or velocity data).

Figure 11:
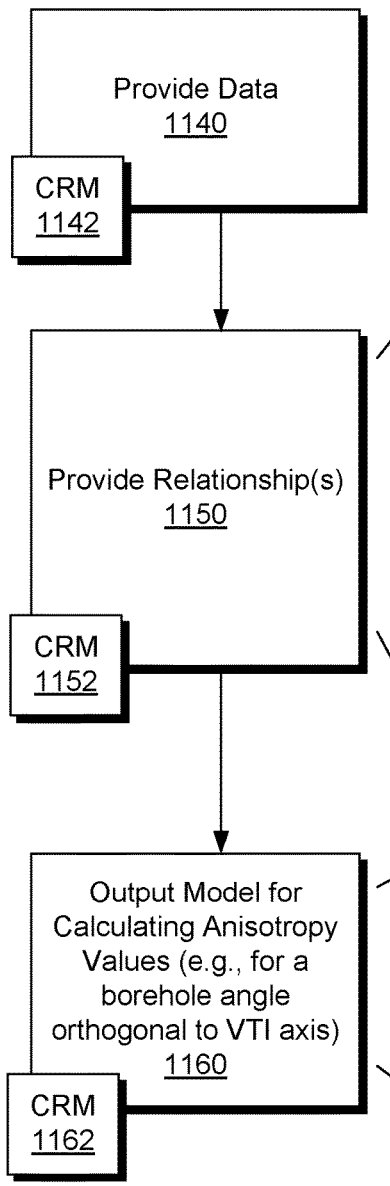
FIG. 11 illustrates an example of a method for outputting a model for calculating unknown anisotropy values.

FIG. 11 shows an example of a method 1110 that includes a data provision block 1140, a relationship provision block 1150 and an output block 1160. FIG. 11 also shows various computer-readable storage media blocks 1142, 1152 and 1162 (CRM), which may include computer-executable instructions to instruct a computing device to perform one or more acts of the method 1110. While individual CRM blocks are shown, a single CRM may include instructions for performing one or more acts associated the data provision block 1140, the relationship provision block 1150 and the output block 1160.

As to the data provision block 1140, it can include providing compressional and shear-wave slowness data for a homogeneous, anisotropic formation at deviated borehole angles greater than about 40 degrees and less than about 90 degrees as defined by a vertical transverse isotropy (VTI) symmetry axis. Further, other data may be provided, for example, sonic data for about 90 degrees, sonic data for about 0 degrees, or a combination thereof. Such data may reside in a data storage device, for example, accessible via a network interface. Thus, the data provision block 1140 may include accessing data from a data storage device.

As to the relationship provision block 1150, in the example of FIG. 11, since for certain types of media, an assumption may be made that the parameter $B_T$ is closely related to the Thomsen parameter $\gamma$, which may be measured in a horizontal section of a well (e.g., or otherwise estimated based on measured data), an empirical relationship may be provided to calculate elastic parameters along the horizontal section of the well (e.g., per the output block 1160). As an example, the relationship provision block 1150 may provide a relationship for $B_N$ and $B_T$. Such a relationship may be a preexisting relationship, for example, stored in a data storage device; thus, the relationship provision block 1150 may include accessing a relationship, related values, etc. As to values for $B_N$ and $B_T$, these may be provided via computations based on data from a formation being analyzed, data from one or more analogous formations or a combination thereof. For example, for a shale formation of interest, compliances may be computed based on data from another shale formation. Where values for $B_N$ and $B_T$ are computed, then a regression analysis may be performed to provide a fit relationship (e.g., an equation). As shown in the example of FIG. 11, such a relationship may be cast in a form to determine $B_N$ as a function of $B_T$: $B_N=m^*B_T-b$ (e.g., where fitting parameter m is a slope and fitting parameter b is an intercept).

As mentioned, the Thomsen parameter $\gamma$ may be determined from a combination of velocity values, a combination of slowness values or a combination of one or more velocity values and one or more slowness values where the values include a value for SH slowness or velocity in a horizontal section of a well in a formation (e.g., $v_{SH}$ or $S_{SH}$ for an angle of about 90 degrees). As an example, $\gamma$ may be determined from fast and slow shear in a horizontal section of a well in a formation. As an example, velocity, slowness or velocity and slowness may provide for $C_{44}$ and $C_{66}$ (see also vertical and horizontal wavefronts 1040 of FIG. 10).

Where $B_T$ can be cast in terms of known elastic coefficients (e.g., $C_{44}$ and $C_{66}$), the ratio $B_N/B_T$, as a provided relationship, may be applied to estimate $B_N$ (e.g., per the aforementioned equation that relates $B_N$ to $B_T$ according to constants from a linear regression analysis). Given such a relationship between $B_N$ and $B_T$, as an example, a method may then include outputting of a model (e.g., per the output block 1160) for calculating one or more of the Thomsen parameters $\varepsilon$ and $\delta$ along the horizontal section of a well. In such an example, using a provided relationship (e.g., through a linear regression analysis), $B_N$ can be predicted (e.g., as a function of $B_T$, which is equated with the same elastic coefficients that define $\gamma$). By having values for $B_N$, $B_T$, $C_{44}$, $C_{66}$ and $C_{11}$ along a horizontal section of a well (e.g., a production well), through use of a model, which may be fit to the provided data of the data provision block 1140, it becomes possible to compute the remaining two elastic parameters $C_{33}$ and $C_{13}$. In the example of FIG. 11, note that the Thomsen parameters ε and δ for a horizontal section may be calculated according to one or more equations (e.g., including for δ*. Further note that the Thomsen parameter δ (and δ*) both depend on $C_{33}$ and $C_{13}$. As an example, the method 1110 of FIG. 11 may provide for determining values for the elastic coefficients $C_{33}$ and $C_{13}$ for any of a variety of purposes.

As an example, a method was implemented using data acquired in a near vertical pilot well and a side tracked production well drilled in a shale gas play. In the vertical pilot well, the gas shale was encountered at a vertical depth of approximately 3860 m. The production well was drilled using a build rate of 11°/30 m (build radius 150 m). The production well was drilled sub-horizontally to a total horizontal distance of approximately 1.4 km. Well logs were acquired in both the vertical pilot hole and over the build and horizontal sections of the production well. A comparison of gamma-ray logs acquired in the vertical pilot well and the build section of the production well showed agreement indicating that the formations were generally laterally homogeneous over the inter-well distance of at most 150 m (e.g., for purposes of ensuring that at least a portion of the bend was located within the shale where data associated with such a portion could be used in a method for determining one or more parameters, elastic coefficients, etc.).

Figure 12:
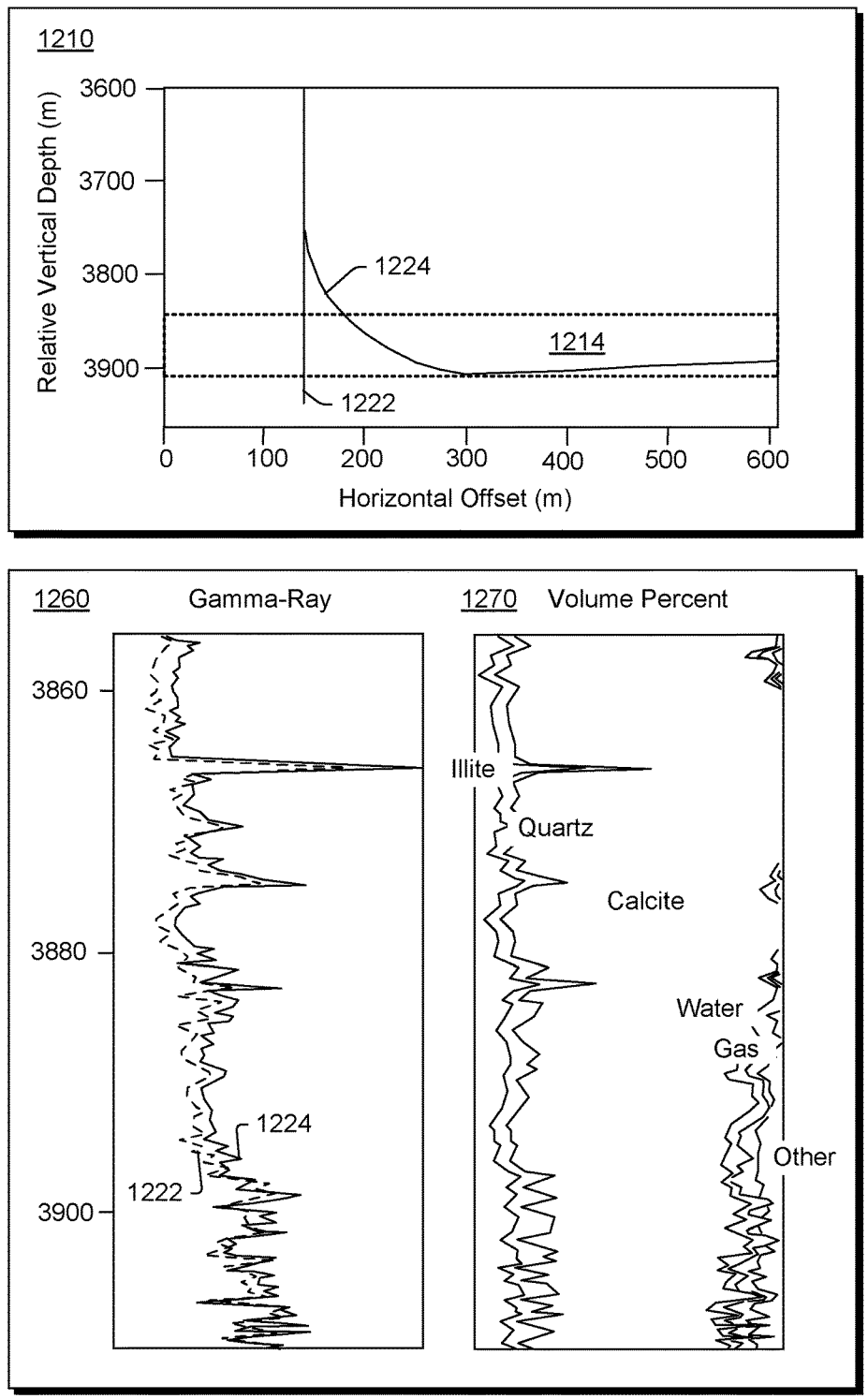
FIG. 12 illustrates a series of plots of data from a formation.

FIG. 12 shows a plot 1210 of the aforementioned vertical well 1222 and the aforementioned production well 1224 in the formation 1214 with respect to relative vertical depth in meters and horizontal offset in meters. FIG. 12 also shows plots 1260 and 1270 for associated gamma-ray logs and lithology logs, respectively, after performing a depth correlation process (see, e.g., the correspondence block 320 of the method 300 of FIG. 3). As shown in the plot 1270 of volume percent versus depth, the lithology logs indicate layers of illite (e.g., a non-expanding, clay-sized, micaceous mineral), quartz, calcite, water, gas and other. At depths greater than about 3880 meters, volume percent of water and gas increases.

Given the data, the method applied an anisotropy estimation process over a depth range of about 75 m (see, e.g., Δz of FIG. 7) from 3835 m to 3910 m corresponding to well deviations of about 35 degrees to about 80 degrees (see, e.g., ΔΘ of FIG. 7) measured from vertical and an offset range of about 150 m. Such a process may include fitting elastic coefficients of a model to measured data such that the model outputs synthetic data that matches the measured data. As mentioned, one or more models selected from various types of models may be employed (e.g., 3D FDTD, point-source, etc.).

Figure 13:
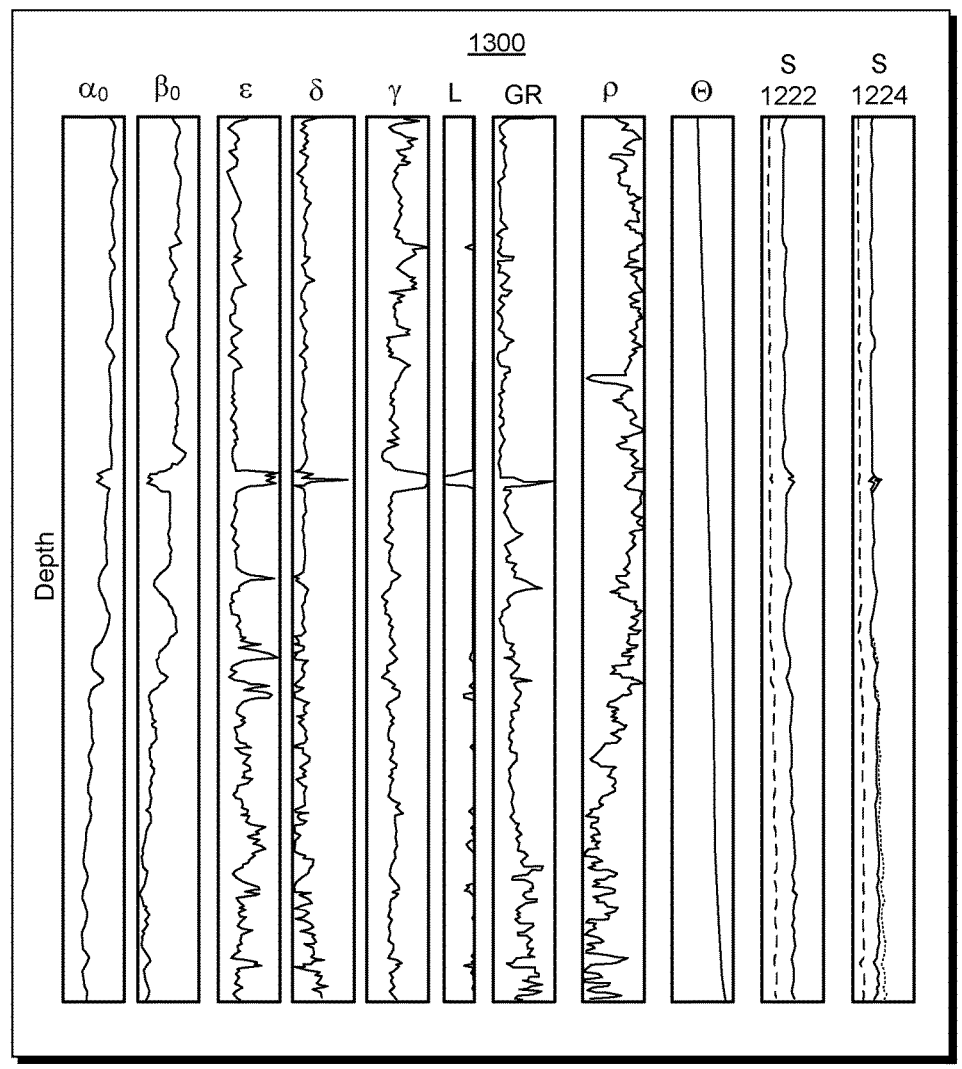
FIG. 13 illustrates a series of plots of data and parameters for the formation of FIG. 12.

FIG. 13 shows a series of plots 1300 for multi-well inversion results that include the Thomsen parameters (labeled $\alpha_0$, $\beta_0$, ε, δ and γ), the likelihood function for the most probable model (labeled L), gamma-ray (labeled GR), density (ρ), well deviation (Θ) and the modeled (thick grey lines) and measured slownesses for the pilot well 1222 and the production well 1224.

The Thomsen parameters in the series of plots 1300 correspond to values versus depth for a most probable model, for example, as fit via a matching process that seeks to minimize differences between measured data and synthetic data. While not shown in the series of plots 1300, for the Thomsen parameters, some spread exists about the plotted values, for example, corresponding to a conditional probability density function (PDF). As an example, a conditional PDF can be used to indicate a parameter's resolution (e.g., whether spread is wide or narrow). Conditional PDFs can be considered to be slices through a multi-dimensional model space and can be computed, for example, by holding model parameters constant apart from one of the model parameters. In the case that a parameter is well resolved, the conditional PDF will be sharply peaked around the optimal solution. Conversely, if the conditional PDF is flat, the parameter is not well resolved. As an example, a method can include rendering spread to a display, for example, as associated with a conditional PDF about a most probable model (e.g., at any point during a matching process). In such an example, a user may readily visualize match and whether further iterations should be performed in an effort to further reduce spread (e.g., for one or more of the Thomsen parameters).

Figure 14:
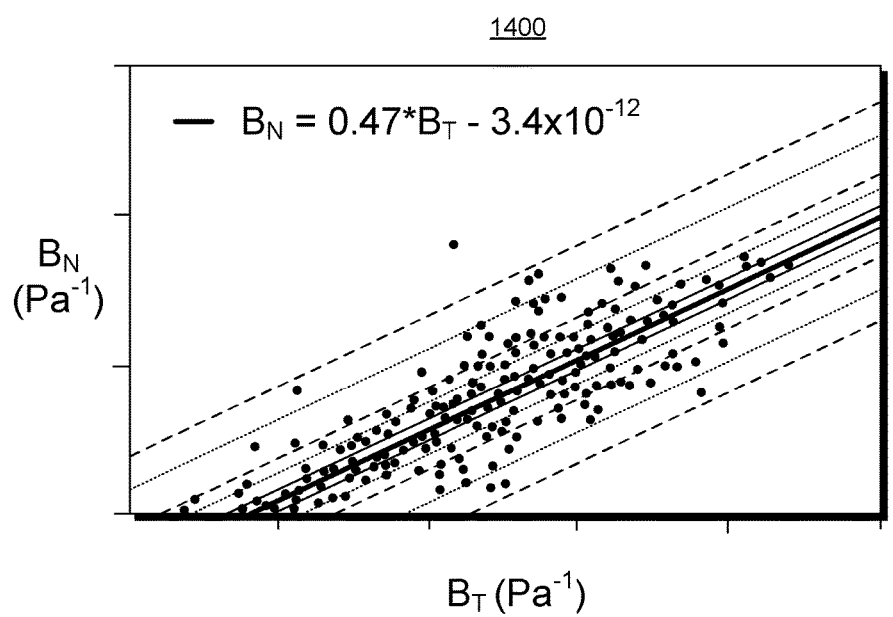
FIG. 14 illustrates an example of a relationship for compliance parameters.

As an example, anisotropic shales can be modeled using low aspect ratio pores characterized by their normal and tangential (or shear) compliances, $B_N$ and $B_T$ respectively (see, e.g., Sayers, 2008). FIG. 14 shows a plot 1400 of these compliances computed over a gas shale formation. Specifically, the plot 1400 shows $B_N$ and $B_T$ cross-plotted to provide a linear relationship, which may be determined via a linear regression process; noting that other relationships and regression processes may be employed (e.g., non-linear or other). As indicated, the two parameters $B_N$ and $B_T$ are strongly correlated with a correlation coefficient of 0.85 where a linear regression provided the relationship $B_N=0.47*B_T-3.4\times10^{-12}$ (e.g., fitting parameter m=0.47 and fitting parameter b=3.4×10$^{-12}$). FIG. 14 also shows dashed and dotted lines as to bands of uncertainty (e.g., standard deviations, etc.).

In the example of FIGS. 12 and 13, the two parameters $B_N$ and $B_T$ exhibited the highest degree of correlation compared to all other anisotropic parameter combinations. As mentioned, since the parameter $B_T$ may be closely related to the Thomsen γ parameter according to elastic coefficients, which can be measured in a horizontal section of a well, an empirical relationship may be used to predict the remaining elastic parameters along the horizontal section of the well.

As an example, consider the linear regression analysis results of the plot 1400 of FIG. 14 where $B_N=0.47*B_T-3.4\times10^{-12}$. In this example, the parameter $B_T$ is computed in the horizontal section of the production well 1224 from the measured fast and slow shear wave slownesses and the density (denoted $S_{SH}$, $S_{SV}$ and ρ respectively):

$$B_T = \frac{C_{66} - C_{44}}{C_{66} * C_{44}}$$

where $C_{44} = \rho S_{SV}^{-2}$ and $C_{66} = \rho S_{SH}^{-2}$.

Similarly, the elastic constant $C_{11}$ can be computed from the compressional slowness ($S_P$) and density (ρ) along the horizontal section of the production well as: $C_{11}=\rho S_P^{-2}$.

Using the derived linear regression relationship, it is possible to predict $B_N$. With $B_N$, $B_T$, $C_{44}$, $C_{66}$ and $C_{11}$ along the horizontal section of the production well 1224, the remaining two elastic parameters $C_{33}$ and $C_{13}$ can be computed:

$$C_{33} = (1 - \delta_N)M_b$$
$$C_{13} = (1 - \delta_N)(M_b - 2C_{66})$$

where $\delta_N = \frac{B_N M_b}{(1+B_N M_b)}$ and $M_B = \frac{C_{11} + 4C_{66}^2 B_N}{(1+2C_{11}C_{66}B_N)}$.

Figure 15:
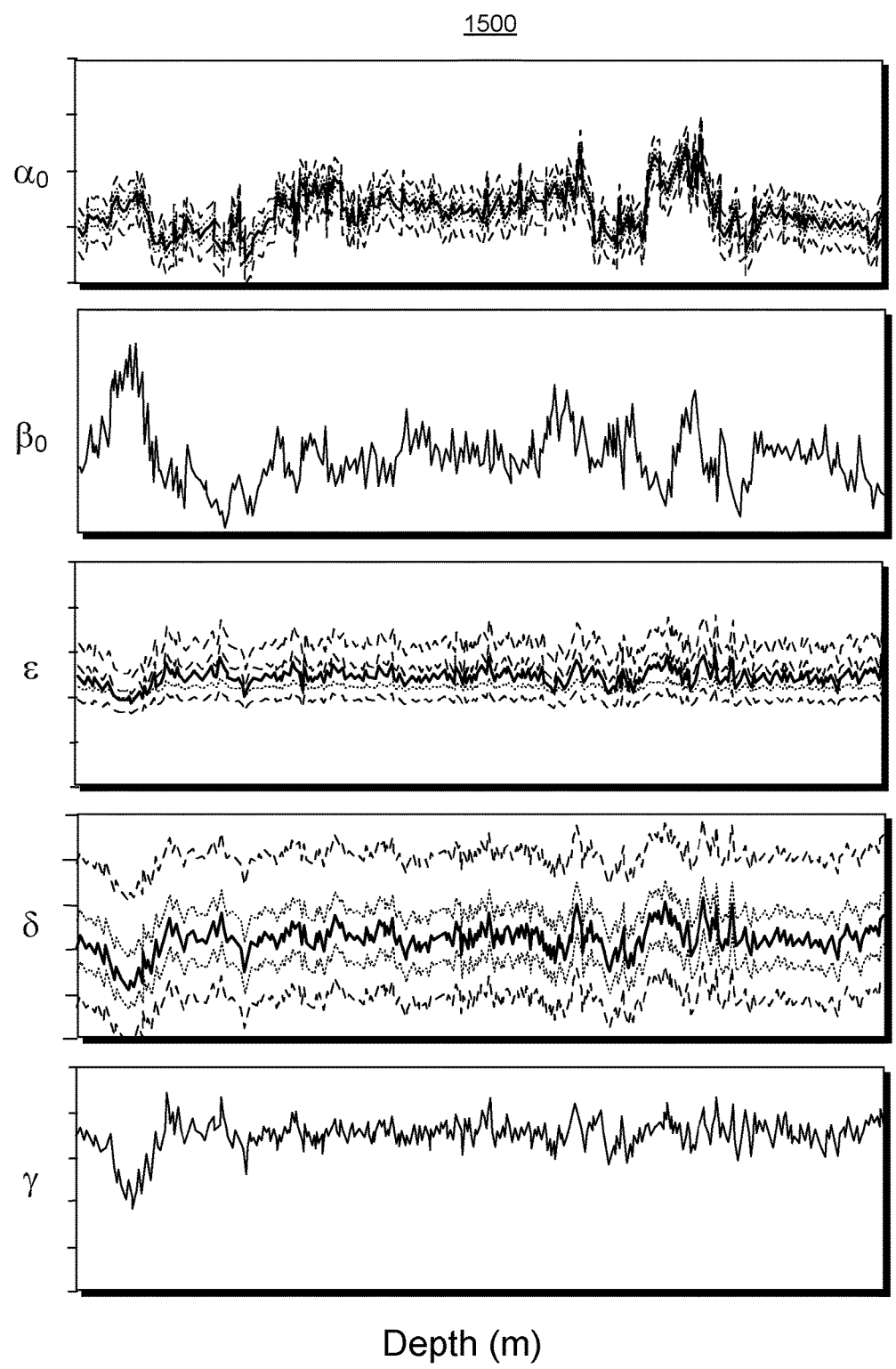
FIG. 15 illustrates a series of plots for Thomsen parameters, some of which depend on the relationship of FIG. 13.

FIG. 15 shows a series of plots 1500 for the calculated Thomsen parameters along the horizontal production section along with calculated errors or uncertainty (see dashed lines about solid lines for the predicted Thomsen parameters). These errors are based on the standard deviation of errors from the regression analysis (see, e.g., the plot 1400 of FIG. 14 and uncertainty represented by dashed and dotted lines). Note that the Thomsen parameter $\gamma$ and vertical shear velocity ($\beta_0$) can be directly measured in the horizontal direction (e.g., data from a vertical section may be optional).

As an example, according to a method such as the method 300 of FIG. 3 or the method 1110 of FIG. 11, predicted elastic properties along a horizontal section of a production well may be determined, optionally along with uncertainty, for example, based on a relationship for $B_N$ and $B_T$. Such a method may include data from a bend alone or a bend in combination with a horizontal section, a bend in combination with a vertical section or a bend in combination with a horizontal and a vertical section. Where sufficient data for a bend alone is provided, a model may provide for estimating one or more parameters for determining values for $C_{33}$ and $C_{13}$ and, for example, the Thomsen parameter $\delta$ (e.g., or $\delta^*$).

While a method according to FIGS. 12, 13, 14 and 15 may be performed in a serial manner, as described with respect to the method 1110 of FIG. 11, a model may be output for calculating values (e.g., block 1160) based on input of data (e.g., block 1140) and a relationship (e.g., block 1150).

As an example, a method can include providing compressional and shear wave slowness data for a homogeneous, anisotropic formation at deviated borehole angles greater than 40 degrees and less than 90 degrees as defined by a vertical transverse isotropy (VTI) symmetry axis; providing a relationship for normal and tangential compliances ($B_N$ and $B_T$); and, based on the data and the relationship, outputting a model for calculating anisotropy parameter values (e.g., $\alpha_0$, $\epsilon$, $\delta$) that characterize the homogeneous, anisotropic formation along a borehole angle of 90 degrees as defined by the VTI symmetry axis. In such an example, the relationship for normal and tangential compliances may be a linear relationship.

As an example, a model for calculating anisotropy parameter values can include an input parameter that depends on a horizontal plane polarized shear wave slowness for a homogeneous, anisotropic formation at an angle of 90 degrees as defined by a vertical transverse isotropy symmetry axis (e.g., for $\gamma$) and an input parameter that depends on another shear-wave slowness for the homogeneous, anisotropic formation at an angle of 0 degrees or 90 degrees as defined by the vertical transverse isotropy symmetry axis (e.g., for $\beta_0$).

As an example, a method can include fitting a relationship for normal and tangential compliances ($B_N$ and $B_T$) to provide a fit relationship. As an example, a model for calculating anisotropy parameter values can provide for calculating anisotropy parameter uncertainty values, for example, where uncertainty in fitting the relationship for normal and tangential compliances ($B_N$ and $B_T$) provides for calculating anisotropy parameter uncertainty values (e.g., along a borehole angle of 90 degrees with respect to a VTI symmetry axis).

As an example, a method can include providing density data for a homogeneous, anisotropic formation. As an example, such data as well as compressional and shear-wave slowness data may include data from a single deviated borehole or data from a plurality of deviated boreholes. As an example, compressional and shear-wave slowness data can include data from a plurality of depths in the homogeneous, anisotropic formation.

As an example, a system can include one or more processors; memory; and processor-executable instructions stored in the memory and executable by at least one of the one or more processors to calculate anisotropy parameter values (e.g., $\alpha_0$, $\epsilon$, $\delta$) that characterize a homogeneous, anisotropic formation along a borehole angle of 90 degrees, as defined by a vertical transverse isotropy symmetry axis, based on compressional and shear-wave slowness data for a plurality of different deviated borehole angles in the homogeneous, anisotropic formation, density data for the homogeneous, anisotropic formation, a horizontal plane polarized shear-wave slowness for the homogeneous, anisotropic formation at an angle of 90 degrees as defined by the vertical transverse isotropy symmetry axis (e.g., for $\gamma$), and a shear-wave slowness for the homogeneous, anisotropic formation for an angle of 0 degrees or 90 degrees as defined by the vertical transverse isotropy symmetry axis (e.g., for $\beta_0$). In such an example, instructions may be included to access an empirical relationship between a tangential compliance parameter ($B_T$) and a normal compliance parameter ($B_N$). Such a relationship may be based on based on data for a shale formation for computing $B_T$ and $B_N$. As an example, the equation $B_T=(C_{66}-C_{44})/(C_{66}*C_{44})$ may be used where $C_{66}$ and $C_{44}$ are coefficients of an elastic modulus matrix.

As an example, a system can include instructions stored in memory and executable by one or more processors can include instructions to access a fit relationship between the compliance parameter ($B_T$) and another compliance parameter ($B_N$), for example, from a data storage device (e.g., via a network interface or other interface).

As an example, a system can include instructions to calculate anisotropy parameter values by calculating $B_T$, determining $B_N$ based on $B_T$ and a fit relationship and to calculate values for coefficients $C_{33}$ and $C_{13}$ of an elastic modulus matrix according to $C_{33}=(1-\delta_N)M_b$, and $C_{13}=(1-\delta_N)(M_b-2C_{66})$ where $$\delta_N = \frac{B_N M_b}{(1+B_N M_b)} \text{ and } M_B = \frac{C_{11} + 4C_{66}^2 B_N}{(1+2C_{11}C_{66}B_N)}$$

and where $C_{11}$ and $C_{66}$ are coefficients of the elastic modulus matrix.

As an example, one or more computer-readable storage media can include computer-executable instructions to instruct a computing device to: access a model and measured data for at least a deviated well in a formation; adjust elastic coefficients of the model to minimize an objective function, that depends on synthetic data computed using the model and the measured data, to provide optimized elastic coefficients for the model; perform a regression analysis on an empirical relationship that includes a parameter substitutable by at least one of the optimized elastic coefficients; and calculate one or more Thomsen parameters for a horizontal section of a well in the formation based at least in part on the model, the optimized elastic coefficients for the model and the regression analysis on the empirical relationship. In such an example, the parameter substitutable by at least one of the optimized elastic coefficients can be tangential compliance ($B_T$). In such an example, the at least one of the optimized elastic coefficients can include elastic coefficients that define the Thomsen parameter γ.

Figure 16:
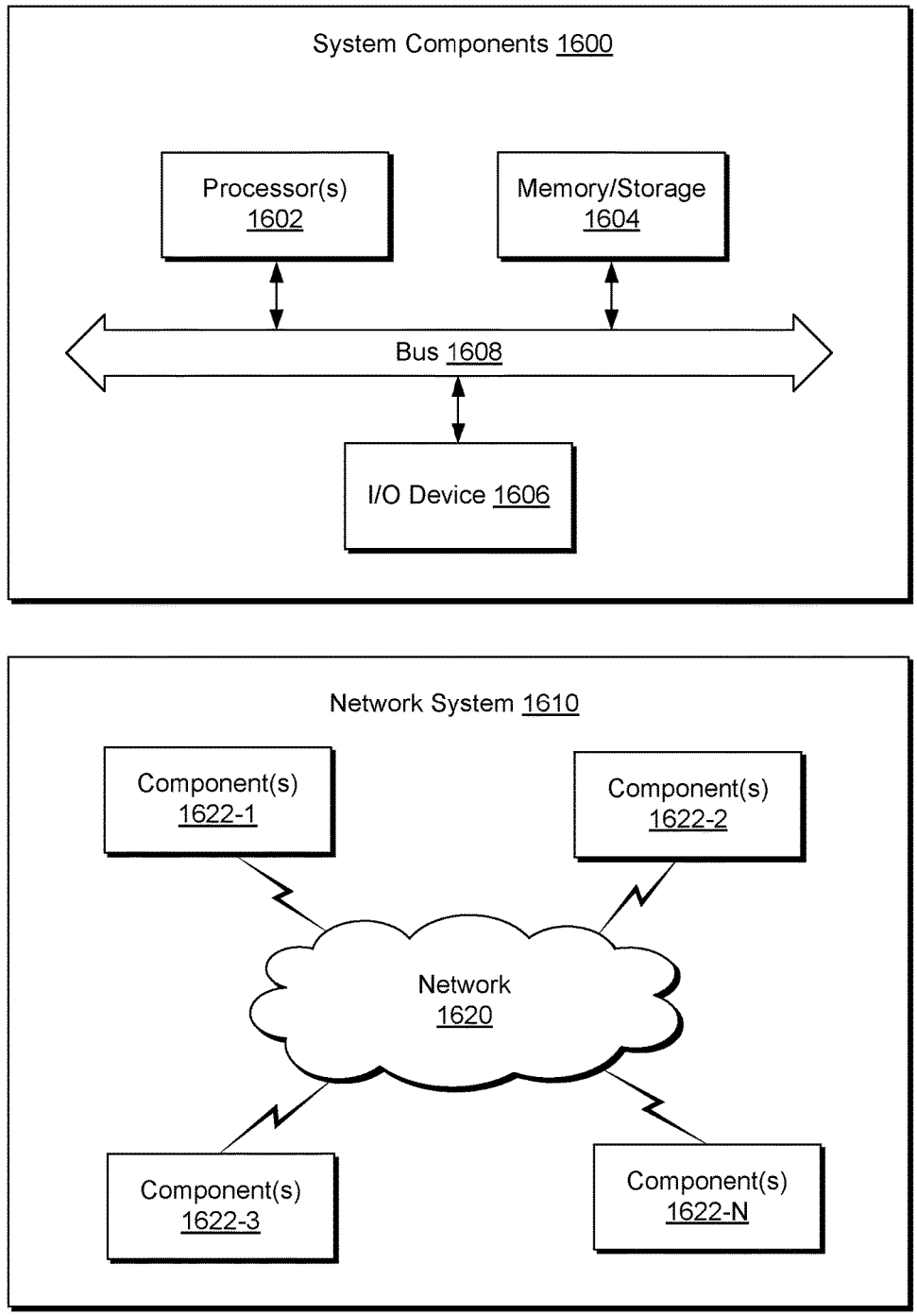
FIG. 16 illustrates example components of a system and a networked system.

FIG. 16 shows components of an example of a computing system 1600 and an example of a networked system 1610. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1602-2 may include an I/O device for display and optionally interaction with a method. The network may be or include the Internet, an intranet, a cellular network, a satellite network, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method, implemented by a computer, for acquiring seismic data in a homogeneous, anisotropic formation and outputting anisotropy parameter values that characterize the homogeneous, anisotropic formation comprising:
    acquiring seismic data that comprises compressional wave slowness data and shear wave slowness data for the homogeneous, anisotropic formation at deviated borehole angles greater than 40 degrees and less than 90 degrees as defined by a vertical transverse isotropy symmetry axis, density data for the homogeneous, anisotropic formation, a horizontal plane polarized shear wave slowness for the homogeneous, anisotropic formation at an angle of 90 degrees as defined by the vertical transverse isotropy symmetry axis, and a shear wave slowness for the homogeneous, anisotropic formation for an angle of 0 degrees or 90 degrees as defined by the vertical transverse isotropy symmetry axis;
    providing an empirical relationship for a normal compliance parameter and a tangential compliance parameter;
    accessing a fit relationship between the tangential compliance parameter, $B_T$, and the normal compliance parameter, $B_N$;
    based on the compressional wave slowness data, the shear wave slowness data, the density data, the horizontal plane polarized shear wave slowness, the shear wave slowness, and the empirical relationship, calculating anisotropy parameter values that characterize the homogeneous, anisotropic formation along a borehole angle of 90 degrees as defined by the vertical transverse isotropy symmetry axis,
    wherein calculating the anisotropy parameter values comprises calculating the tangential compliance, $B_T$; determining the normal compliance, $B_N$, based on the tangential compliance, $B_T$, and the fit relationship; calculating values for coefficients $C_{33}$ and $C_{13}$ of an elastic modulus matrix according to $C_{33}=(1-\delta_N)M_b$ and $C_{13}=(1-\delta_N)(M_b-2C_{66})$ wherein $$\delta_N = \frac{B_N M_b}{(1+B_N M_b)} \text{ and } M_B = \frac{C_{11}+4C_{66}^2 B_N}{(1+2C_{11}C_{66}B_N)}$$

and wherein $C_{11}$ and $C_{66}$ are coefficients of the elastic modulus matrix; and
    outputting the anisotropy parameter values for characterization of the homogeneous, anisotropic formation.

2. The method of claim 1 wherein the empirical relationship for normal and tangential compliances comprises a linear relationship.

3. The method of claim 1 wherein calculating the anisotropy parameter values further provides for calculating anisotropy parameter uncertainty values.

4. The method of claim 3 wherein uncertainty in fitting the empirical relationship for normal and tangential compliances provides for calculating anisotropy parameter uncertainty values.

5. The method of claim 1 wherein the acquiring seismic data that comprises compressional wave slowness data and shear wave slowness data comprises accessing the compressional wave slowness data and shear wave slowness data from a data storage device.

6. The method of claim 1 wherein the compressional wave slowness data and shear wave slowness data comprise data from a single deviated borehole.

7. The method of claim 1 wherein the compressional wave slowness data and shear wave slowness data comprise data from a plurality of deviated boreholes.

8. The method of claim 1 wherein the compressional wave slowness data and shear wave slowness data comprise data from a plurality of depths in the homogeneous, anisotropic formation.

9. A system comprising:
    one or more processors;
    memory; and
    processor-executable instructions stored in the memory and executable by at least one of the one or more processors to:
    acquire seismic data that comprises compressional wave slowness data and shear wave slowness data for a plurality of different deviated borehole angles in a homogeneous, anisotropic formation;
access an empirical relationship between a tangential compliance parameter and a normal compliance parameter;
access a fit relationship between the tangential compliance parameter, $B_T$, and the normal compliance parameter, $B_N$;
calculate anisotropy parameter values that characterize the homogeneous, anisotropic formation along a borehole angle of 90 degrees, as defined by a vertical transverse isotropy symmetry axis, based on
at least a portion of the compressional wave slowness data and shear wave slowness data,
density data for the homogeneous, anisotropic formation,
a horizontal plane polarized shear wave slowness for the homogeneous, anisotropic formation at an angle of 90 degrees as defined by the vertical transverse isotropy symmetry axis, and
a shear wave slowness for the homogeneous, anisotropic formation for an angle of 0 degrees or 90 degrees as defined by the vertical transverse isotropy symmetry axis,
wherein the instructions to calculate anisotropy parameter values comprise instructions to calculate the tangential compliance, $B_T$; determine the normal compliance, $B_N$, based on the tangential compliance, $B_T$, and the fit relationship; calculate values for coefficients $C_{33}$ and $C_{13}$ of an elastic modulus matrix according to $C_{33}=(1-\delta_N)M_b$ and $C_{13}=(1-\delta_N)(M_b-2C_{66})$ wherein $$\delta_N = \frac{B_N M_b}{(1+B_N M_b)} \text{ and } M_B = \frac{C_{11}+4C_{66}^2 B_N}{(1+2C_{11}C_{66}B_N)}$$

and wherein $C_{11}$ and $C_{66}$ are coefficients of the elastic modulus matrix; and
output the anisotropy parameter values for characterization of the homogeneous, anisotropic formation.

10. The system of claim 9 wherein the empirical relationship comprises a relationship based on data for a shale formation for computing the tangential compliance, $B_T$, and the normal compliance, $B_N$.

11. The system of claim 9 wherein the tangential compliance $B_T = (C_{66}-C_{44})/(C_{66}*C_{44})$ wherein $C_{66}$ and $C_{44}$ are coefficients of an elastic modulus matrix.

12. One or more computer-readable storage media comprising computer-executable instructions to instruct a computing device to:
acquire measured data via one or more sensors;
access a model and the measured data for at least a deviated well in a homogeneous, anisotropic formation along a borehole angle of 90 degrees, as defined by a vertical transverse isotropy symmetry axis, wherein the measured data comprise compressional wave slowness data and shear wave slowness data for a plurality of different deviated borehole angles in the homogeneous, anisotropic formation, density data for the homogeneous, anisotropic formation, a horizontal plane polarized shear wave slowness for the homogeneous, anisotropic formation at an angle of 90 degrees as defined by the vertical transverse isotropy symmetry axis, and a shear wave slowness for the homogeneous, anisotropic formation for an angle of 0 degrees or 90degrees as defined by the vertical transverse isotropy symmetry axis;
determine an objective function, that depends on a difference between synthetic data computed using the model and the measured data;
adjust elastic coefficients of the model to produce a minimal objective function for optimized elastic coefficients for the model based on the minimal objective function;
perform a regression analysis on an empirical relationship that comprises a parameter substitutable by at least one of the optimized elastic coefficients, wherein the parameter substitutable by at least one of the optimized elastic coefficients comprises tangential compliance and normal compliance;
calculate one or more Thomsen parameters for a horizontal section of a well in the homogeneous, anisotropic formation based at least in part on the model, the optimized elastic coefficients for the model and the regression analysis on the empirical relationship, wherein the computer-executable instructions to instruct a computing device to calculate the one or more Thomsen parameters comprise instructions to calculate the tangential compliance, $B_T$; determine the normal compliance, $B_N$, based on the tangential compliance, $B_T$, and the empirical relationship; calculate values for coefficients $C_{33}$ and $C_{13}$ of an elastic modulus matrix according to $C_{33}=(1-\delta_N)M_b$ and $C_{13}=(1-\delta_N)(M_b-2C_{66})$ wherein $$\delta_N = \frac{B_N M_b}{(1+B_N M_b)} \text{ and } M_B = \frac{C_{11}+4C_{66}^2 B_N}{(1+2C_{11}C_{66}B_N)}$$

and wherein $C_{11}$ and $C_{66}$ are coefficients of the elastic modulus matrix; and
output the anisotropy parameter values for characterization of the homogeneous, anisotropic formation.

13. The one or more computer-readable storage media of claim 12 wherein the at least one of the optimized elastic coefficients comprise elastic coefficients that define the Thomsen parameter γ.

* * * * *